United States Patent
Suzuki et al.

[11] Patent Number: 5,959,199
[45] Date of Patent: Sep. 28, 1999

[54] APPARATUS FOR MEASURING THE CONTOUR OF A LENS-SHAPED TEMPLATE FORMED TO BE FIT IN A LENS FRAME OF AN EYEGLASS FRAME

[75] Inventors: Yasuo Suzuki; Kenichi Watanabe; Yasuhito Eto, all of Tokyo, Japan

[73] Assignee: Kabushiki Kaisha Topcon, Tokyo, Japan

[21] Appl. No.: 08/975,504

[22] Filed: Nov. 21, 1997

[30] Foreign Application Priority Data

| Nov. 22, 1996 | [JP] | Japan | 8-311529 |
| Nov. 29, 1996 | [JP] | Japan | 8-320467 |
| Dec. 12, 1996 | [JP] | Japan | 8-332532 |

[51] Int. Cl.$^6$ ............... G01B 5/06; G01B 5/20; G01B 21/20; B24B 9/14
[52] U.S. Cl. ............................. 73/104; 33/507
[58] Field of Search ............... 73/104; 33/200, 33/507, 551

[56] References Cited

U.S. PATENT DOCUMENTS

| 4,991,305 | 2/1991 | Saigo et al. ............... 33/507 |
| 5,121,550 | 6/1992 | Wood et al. ............... 33/507 X |
| 5,501,017 | 3/1996 | Suzuki ............... 33/507 X |
| 5,515,612 | 5/1996 | Igarashi et al. ............... 33/507 X |
| 5,594,992 | 1/1997 | Suzuki et al. ............... 33/507 X |
| 5,615,486 | 4/1997 | Igarashi et al. ............... 33/507 X |

FOREIGN PATENT DOCUMENTS

| 0 344 725 | 12/1989 | European Pat. Off. . | |
| 3-20604 | 1/1991 | Japan | 33/507 |
| 3-135708 | 6/1991 | Japan | 33/200 |
| 6-194153 | 7/1994 | Japan | 33/507 |

OTHER PUBLICATIONS

Patent Abstracts of Japan of Publication No. 06194163, dated Jul. 15, 1994.

*Primary Examiner*—Daniel S. Larkin
*Attorney, Agent, or Firm*—Finnegan, Henderson, Farabow, Garrett & Dunner, L.L.P.

[57] ABSTRACT

An apparatus is provided for measuring a contour of a lens-shaped template formed to be fit into a lens frame of an eyeglass frame. The apparatus includes a lens-shaped template holding device (111) for holding a lens-shaped template (112) formed to be fit into a lens frame (LF, RF) of an eyeglass frame (MF), a measurement element (219) for measuring the contour of the lens-shaped template (112) held by the lens-shaped template holding device (111), a measurement starting device (13) for starting the measurement of the lens-shaped template (112) by the measurement element (219), and a measurement element positioning device (700) for positioning the measurement element (219) at a reference point when the measurement starting device (13) starts the measurement element (219) measuring the lens-shaped template (112).

8 Claims, 23 Drawing Sheets

APPARATUS FOR MEASURING THE CONTOUR OF A LENS-SHAPED TEMPLATE FORMED TO BE FIT IN A LENS FRAME OF AN EYEGLASS FRAME

BACKGROUND OF THE INVENTION

1. Field of the Invention

This invention relates to an apparatus for measuring the contour of a lens frame (lens opening) of an eyeglass frame or the contour of a lens-shaped template formed to be fit in the lens frame.

2. Description of the Related Art

As disclosed in Japanese Laid-Open Patent Application No. Hei 6-194153, for example, a conventional template-measuring apparatus is known in which a measuring element for measuring a lens frame and a measuring element for measuring a template are spaced away from each other and, when the template is measured, the template measuring element is manually erected to be situated at a template measuring position as a measurement reference position, so that the contour of the template can be measured.

However, this type measuring apparatus is troublesome and difficult to set the template measuring element.

In addition, there is a fear that when an operator (artisan) measures the contour of the template, he/she will forget to set the template measuring element, or, when the operator changes the measurement of the template to the measurement of the lens frame, he/she will forget to stow the template measuring element.

For this reason, there is also a fear that the eyeglass frame will collide with the template measuring element by mistake and thus the eyeglass frame will be deformed or broken.

SUMMARY OF THE INVENTION

It is therefore an object of the present invention to provide a lens-shaped template contour measuring apparatus in which a template measuring element is positioned at a measurement reference point by a position control means, based on a start signal by which the measuring element starts the measurement of the template.

It is another object of the present invention to provide a lens-shaped template contour measuring apparatus in which a sensing means senses that a lens-shaped template holding means holds a lens-shaped template and, based on a sensed result, a lens-shaped template measuring element is positioned at a measurement reference point by a position control means.

To achieve the objects, the measuring apparatus according to a first aspect of the present invention comprises a lens-shaped template holding means for holding the lens-shaped template; a measurement element for measuring a contour of the lens-shaped template held by the lens-shaped template holding means; a starting means for starting the measurement element measuring the contour of the lens-shaped template; and a positioning means for positioning the measurement element at a measurement reference point when the starting means starts the measurement by the measurement element.

To achieve the objects, the measuring apparatus according to a second aspect of the present invention comprises a lens frame holding means for holding the lens frame of the eyeglass frame; a lens-shaped template holding means for holding a lens-shaped template; measurement elements for measuring a contour of the lens frame held by the lens frame holding means and measuring a contour of the lens-shaped template held by the lens-shaped template holding means, respectively; a sensing means for sensing that the template holding means has been attached to an apparatus body; and a positioning means for positioning each of the measurement elements at a measurement reference point, based on a result of the sensing means.

Preferably, the measuring apparatus according to the second aspect of the present invention further comprises a slider disposed to horizontally proceed and recede and horizontally rotate; an eyeglass frame holding means, disposed above the slider, for holding the eyeglass frame; a lens-shaped template holding means, disposed above the slider, for holding the lens-shaped template; the measurement element for the lens frame being attached to the slider so as to be vertically movable and being engaged with a V-shaped groove of the lens frame of the eyeglass frame; a radius vector measurement means for measuring a vector radius of the lens frame or the lens-shaped template, based on an amount of horizontal movement of the slider; the measurement element for the lens-shaped template being attached to the slider so as to be freely erected and laid down, and measuring the contour of the lens-shaped template held by the lens-shaped template holding means during being erected; a feeler erecting means for erecting and positioning the lens-shaped template measurement element at the measurement reference point, based on a result of the sensing means, so that the contour of the lens-shaped template held by the lens-shaped template holding means can be measured; and an arithmetic and control means for calculating a radius vector $\rho i$ from the radius vector measurement means with respect to an angle $\theta i$ of rotation of the slider.

DETAILED DESCRIPTION OF THE PREFERRED EMBODIMENTS

Embodiments of an apparatus for measuring the contour of a lens-shaped template formed to be fit in a lens frame of an eyeglass frame according to the present invention will be described with reference to the attached drawings.

Figure 2:
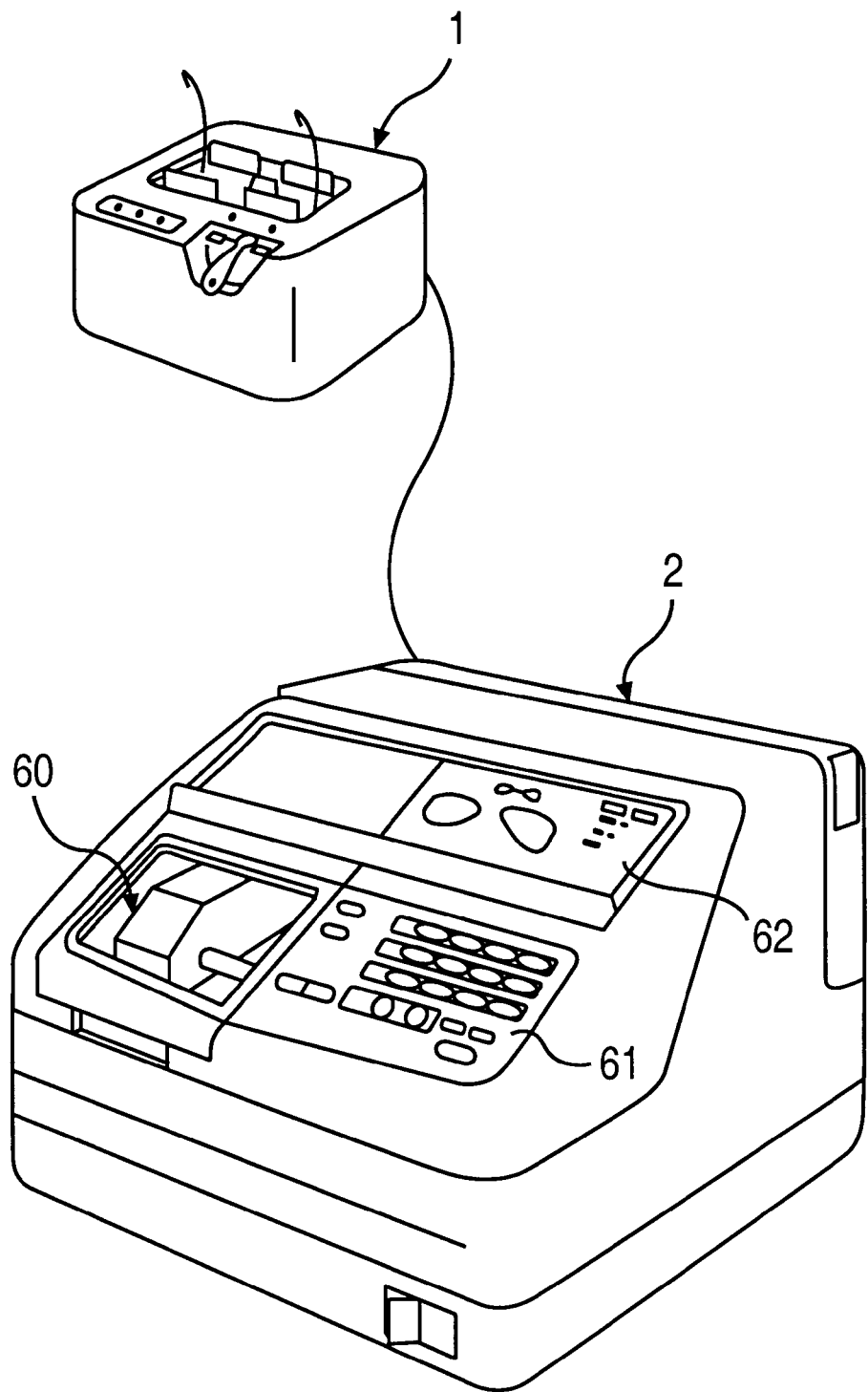
FIG. 2 is a schematic perspective view of the apparatus provided with the control circuit shown in FIG. 1.

In FIG. 2, reference numeral 1 denotes a frame contour measuring apparatus and reference 2 denotes a grinding apparatus (lens edging apparatus) for grinding and shaping an uncut lens into a finished eyeglass lens, based on eyeglass-contour data obtained from the apparatus 1.

(1) Frame Contour Measuring Apparatus 1

Figure 4:
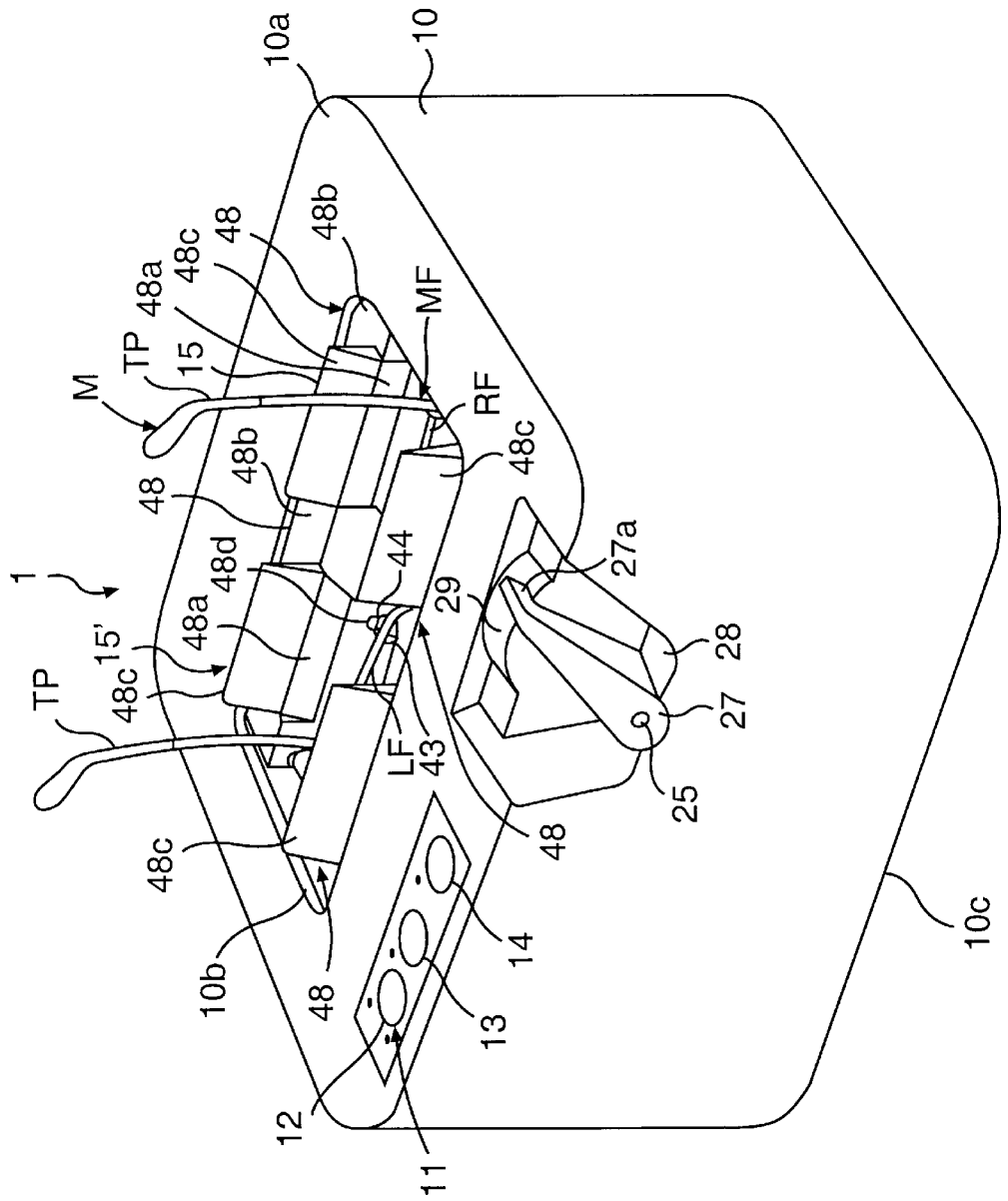
FIG. 4 is an enlarged perspective view of a frame contour measuring apparatus shown in FIG. 2.

As shown in FIG. 4, the frame contour measuring apparatus 1 comprises an apparatus body 10 having an opening 10b in the middle of an upper surface 10a and a switch portion (operation panel) 11 mounted on the upper surface 10a of the body 10. The switch portion 11 includes a mode changing switch 12 for changing over right and left measurement modes, a start switch 13 serving as a lens-shaped template measurement starting means (frame template measurement starting means) and as a lens frame measurement starting means, and a transfer switch 14 for transferring data.

Figure 5A:
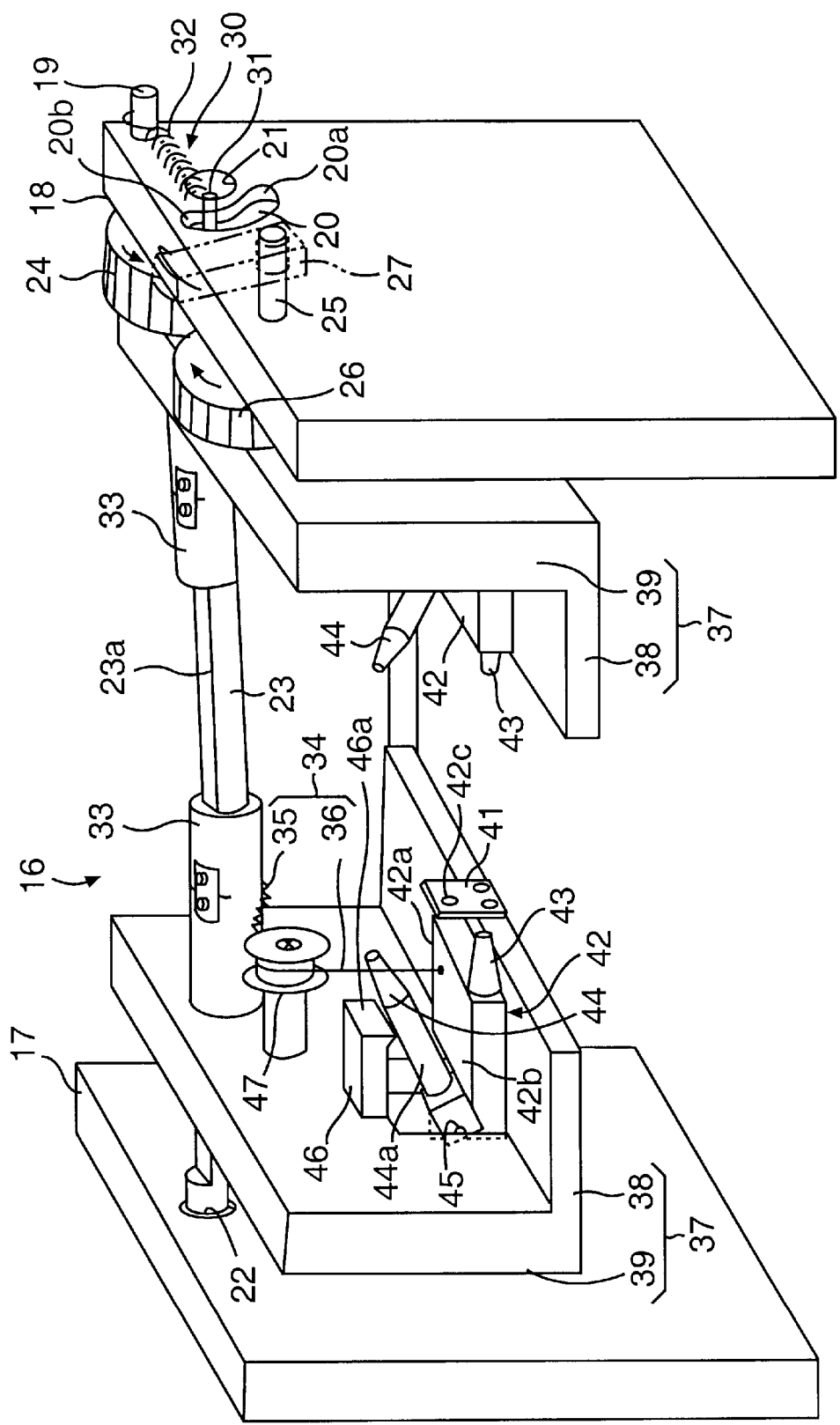
FIG. 5(a) is a perspective view of a main portion of the frame contour measuring apparatus shown in FIGS. 2 and 4.
Figure 7A:
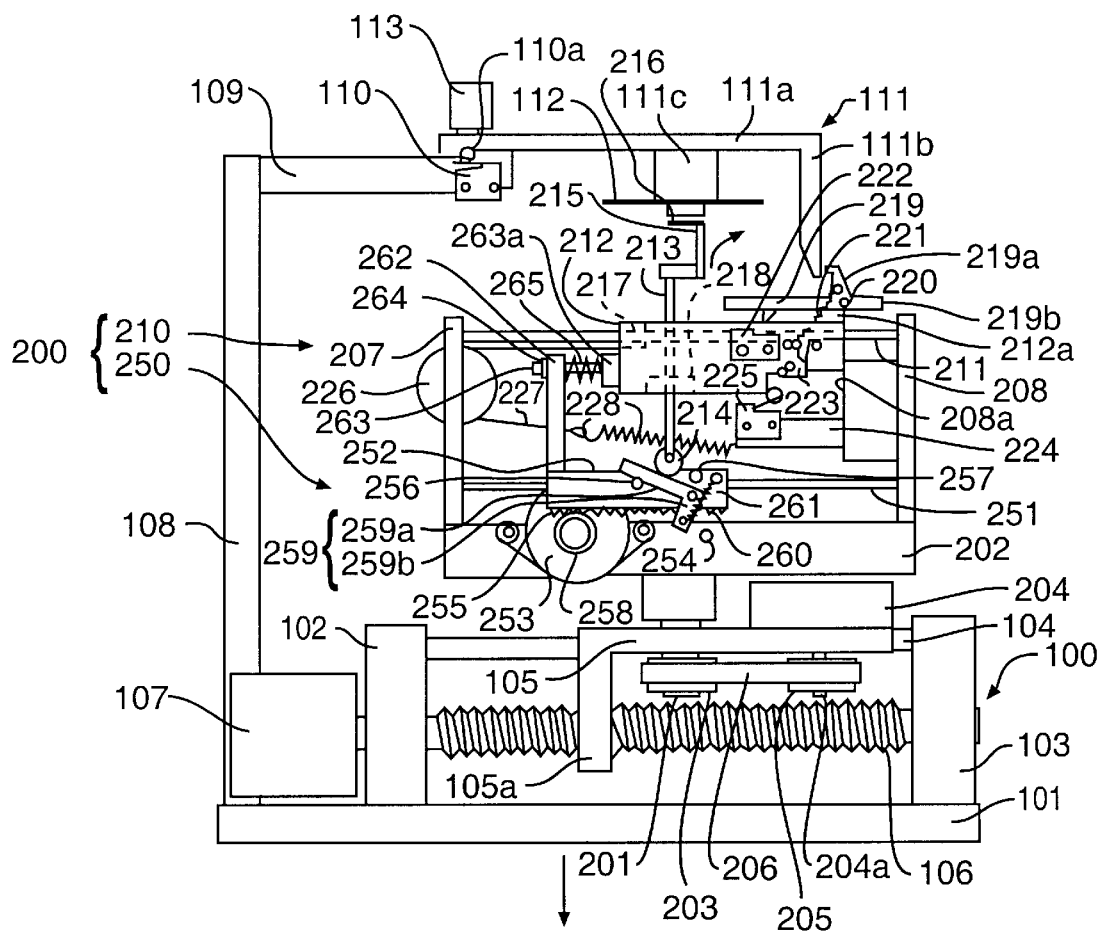
FIGS. 7(a) and 7(b) are schematic views of a frame contour measuring section, etc. of the measuring apparatus.
Figure 7B:
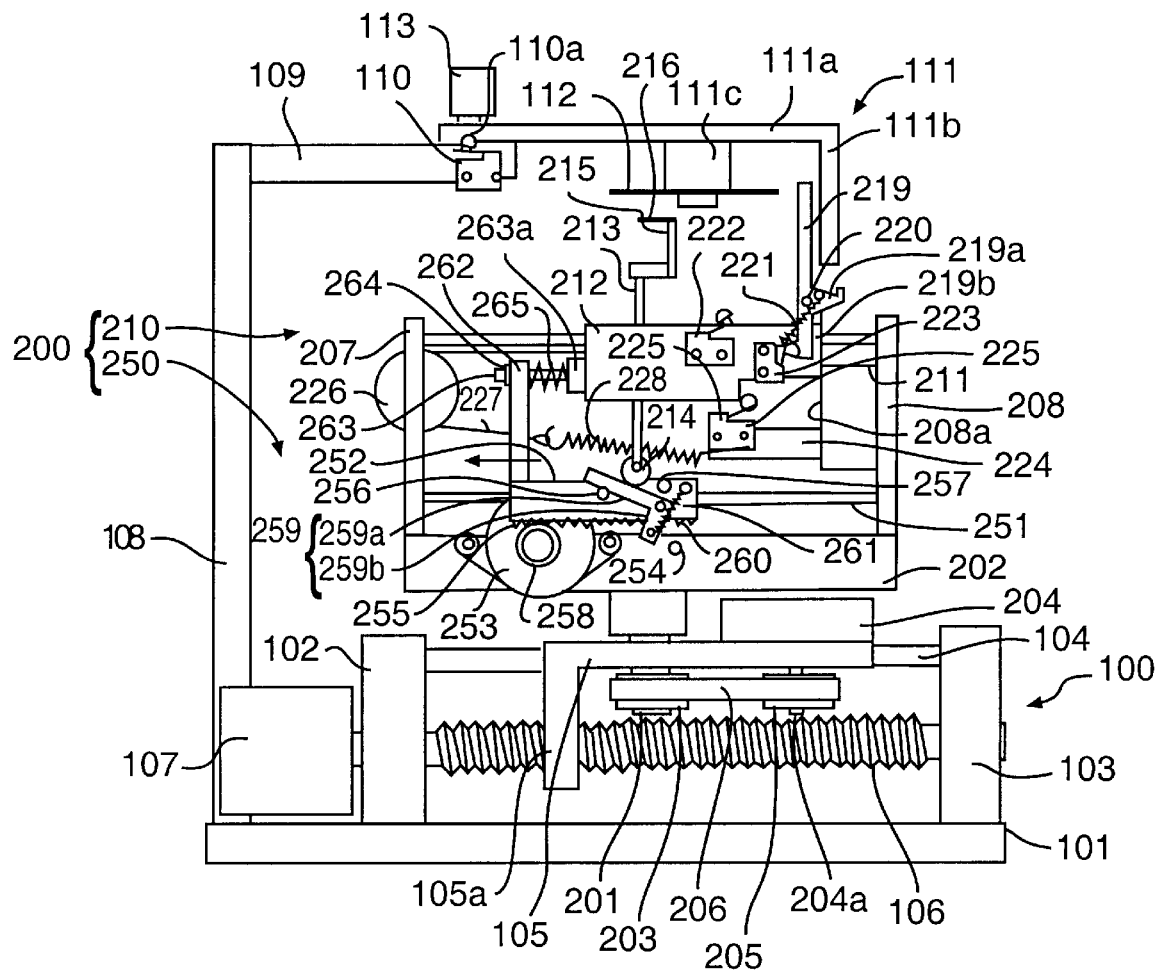
Figure 8A:
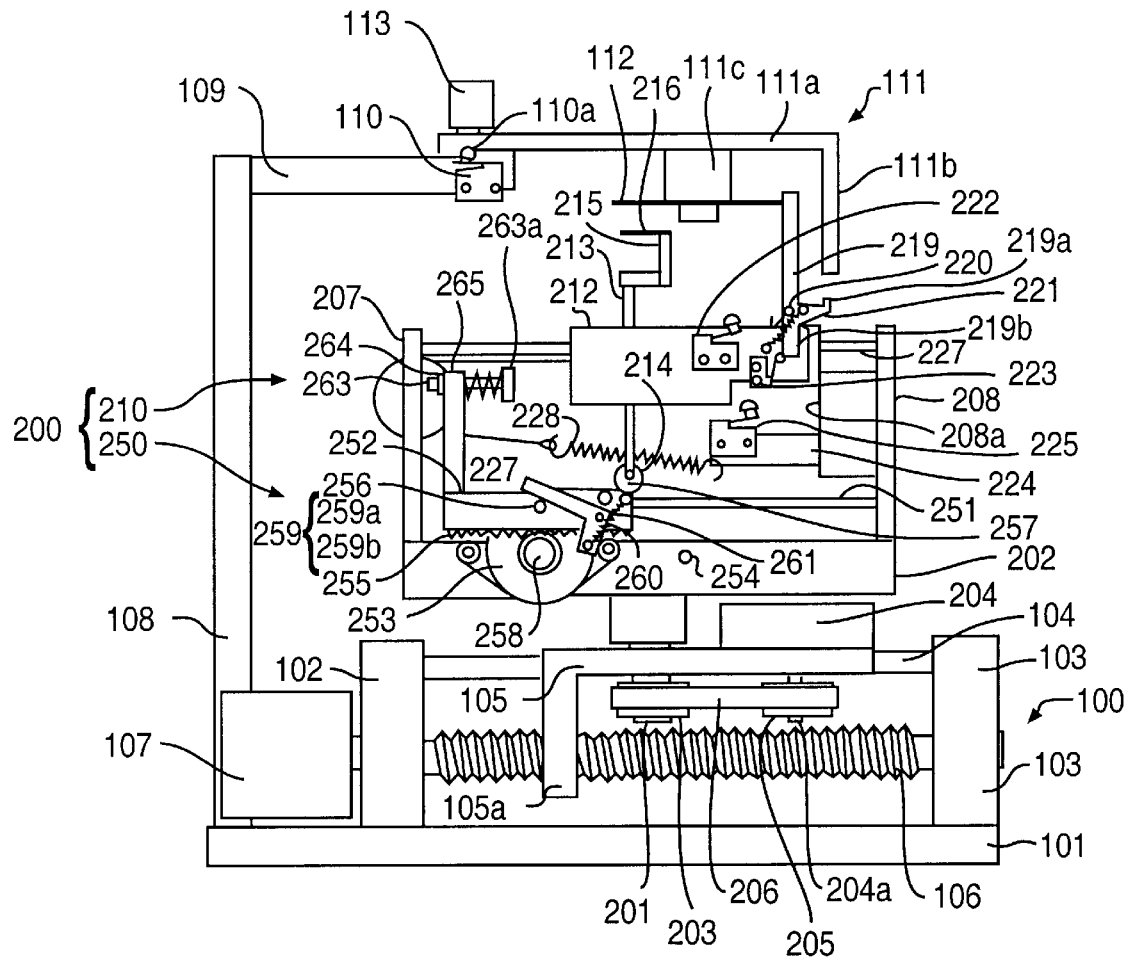
FIGS. 8(a) and 8(b) are schematic views of a frame contour measuring section, etc. of the measuring apparatus.
Figure 8B:
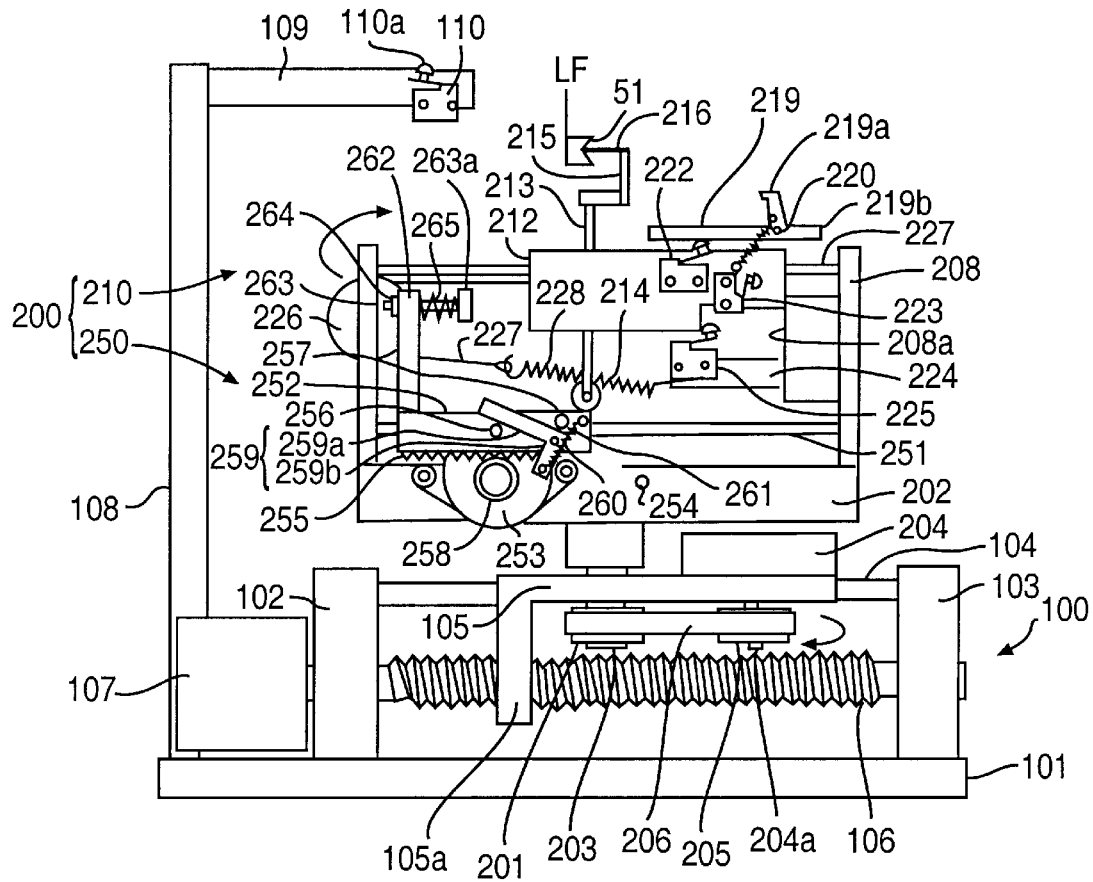

The apparatus 1 further comprises eyeglass frame holding mechanisms (lens frame holding means) 15, 15' for holding right and left lens frames LF, RF of an eyeglass frame MF of eyeglasses M as shown in FIG. 4, an operation mechanism 16 (see FIG. 5(a)), a measurement portion moving mechanism 100 as shown in FIGS. 7(a), 7(b), and a frame contour measurement portion (frame contour measuring means) 200 supported by the mechanism 100.

The measurement portion moving mechanism 100 moves the frame contour measurement portion 200 between the eyeglass frame holding mechanisms 15 and 15'. The frame contour measurement portion 200 measures the contour of the eyeglass frame MF, in more detail, measures the contour of the lens frame LF (RF) thereof. These mechanisms 15, 15', 16, 100, and the measurement portion 200 are mounted within the apparatus body 10.

In FIGS. 7(a) and 7(b), reference numeral 101 denotes a chassis as a fixed base disposed on a lower part of the body 10. In FIG. 5(a), reference numerals 17 and 18 denote supporters (not shown in the chassis 101) mounted in parallel to each other and fixed upward and downward, reference numeral 19 denotes an engagement pin projecting from an outside surface (opposite to the supporter 17) of the supporter 18, reference numeral 20 denotes a circular slit mounted on an upper end portion of the supporter 18, reference numerals 21 and 22 denote mounting holes formed in the supporters 17 and 18, respectively. The mounting hole 22 is formed between the circular slit 20 and the engagement pin 19. The circular slit 20 is concentric with the mounting hole 22.

Operation Mechanism 16

The operation mechanism 16 comprises an operation shaft 23 rotatably held in the mounting holes 21, 22 of the supporters 17 and 18, a driven gear 24 fixed to an end portion of the operation shaft 23 on the side of the supporter 18, a rotation shaft 25 passing through the supporter 18 and a front surface 10c of the body 10, a driving gear 26 fixed to an end portion of the rotation shaft 25 (or formed integrally with the rotation shaft 25) and engaged with the driving gear 24, and an operation lever 27 mounted on the other end portion of the rotation shaft 25. Reference numeral 23a denotes a flat portion formed on the operation shaft 23 and extending close to the two end portions of the operation shaft 23.

In the apparatus body 10, a concave portion 28 is formed extending from the front surface 10c to the upper surface 10a, and a circular projection 29 is formed on the concave portion 28. Signs "ON" and "OFF" are provided on the upper surface 10a and are positioned on right and left sides of the projection 29, respectively. The lever 27 is disposed on a front surface of the concave portion 28, and a curved portion, namely, instruction portion 27a is mounted on an upper portion of the lever 27 and is movable on the projection 29.

Between the driving gear 24 and the engagement pin 19, a two-position holding mechanism (two-position holding means) 30 is mounted for holding the frame (corresponding to the sign "ON") and releasing the frame from being held (corresponding to the sign "OFF").

The two-position holding mechanism 30 comprises the circular slit 20, a movable pin 31 projecting from a side surface of the driving gear 24 and passing through the circular slit 20, and a spring 32 (tension coil spring) arranged between the movable pin 31 and the engagement pin 19. Since the circular slit 20 is concentric with the mounting hole 22 as mentioned above, the driving gear 24 and the operation shaft 23 are also concentric with each other. For this reason, the movable pin 31 is held by one of two end portions 20a and 20b of the circular slit 20 by the spring 32.

Figure 5B:
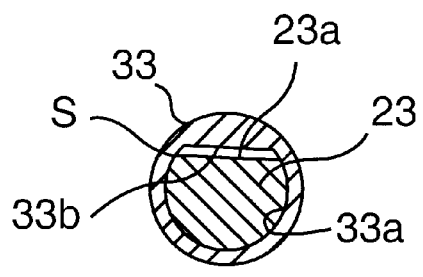
FIGS. 5(b) and 5(c) are each a sectional view for explaining the relationship between a barrel shaft and an operation shaft.
Figure 5C:
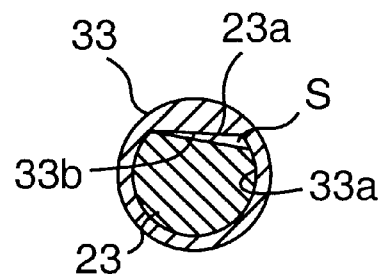

The operation mechanism 16 further comprises a pair of barrel shafts 33, 33 held such that the pair of barrel shafts 33, 33 are movable in a longitudinal direction of the operation shaft 23 and are slightly rotatable relatively in a circumferential direction. Between a flat portion 33b of a cut-circular through-hole 33a of the barrel shaft 33 and the flat portion 23a of the operation shaft 23, a slight space S is formed as shown in FIGS. 5(b) and 5(c). In the barrel shafts 33, 33, string-like bodies 34 (only one is shown in FIG. 5(a)) are mounted each of which includes a portion which is elastic because of its own elastic force. The string-like body 34 comprises a spring (elastic portion) 35 an end of which is fixed to the barrel shaft 33 and a wire 36 connected to the other end of the spring 35.

Frame Holding Mechanisms 15, 15'

The frame holding mechanisms 15, 15' are same in structure, and therefore only the frame holding mechanism 15 will be described.

The frame holding mechanism 15 comprises a pair of movable supporter 37, 37 as sliders held in the body 10 which are movable in a horizontal direction and are movable close to (or away from) each other. Each of the movable supporters 37, 37 is shaped like "L" which consists of a horizontal plate portion 38 and a vertical plate portion 39 which vertically extends from an end of the horizontal plate portion 38. In the vertical plate portion 89, the barrel shaft 33 is held rotatably but cannot be moved in an axial direction.

The frame holding mechanism 15 further comprises a tension coil spring 40 which is arranged between the horizontal plate portions 38, 38 of the movable supporters 37, 37 as shown in FIG. 6, a supporting plate 41 fixed in the center of a front end of the horizontal plate portion 38, and a claw mounting plate 42 disposed between the vertical plate portion 39 and a part of the supporting plate 41 which projects from the horizontal plate portion 38 upward. The claw mounting plate 42 is held by both the supporting plate 41 and the vertical plate portion 39 so as to be rotatable centering a shaft-shaped supporting projection 42c of a side portion 42a. Another shaft-shaped supporting projection of a rear side portion of the claw mounting plate 42 is not shown.

Figure 5D:
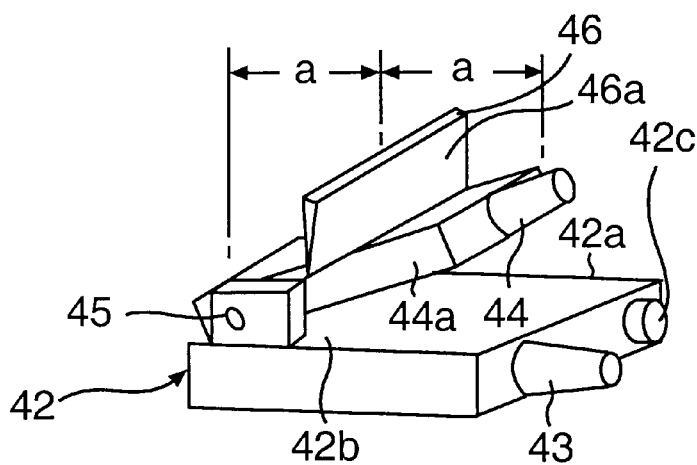
FIG. 5(d) is a schematic view of a holding claw.

A tapered holding-claw 43 projects from a front end of the other side portion 42b of the claw mounting plate 42, and a rear end portion 44a of a shaft-shaped holding claw 44 is held rotatably by a supporting shaft 45 on a rear end of the other side portion of the claw mounting plate 42. The supporting claw 44, of which a base is shaped like a square plate as shown in FIG. 5(d) and the front end portion is tapered, is rotatable on the supporting shaft 45 and is allowed to relatively approach the supporting claw 43 or recede therefrom. Additionally, the front end portion of the supporting claw 44 and the claw mounting plate 42 are urged to be opened by a torsion spring (not shown) wound on the supporting shaft 45.

In the vertical plate portion 39, an "L"-shaped engagement claw 46 is projected therefrom and is positioned above the holding claw 44. An edge-shaped claw 46a of a front end portion of the engagement claw 46 which extends downward is engaged with the supporting claw 44. Thus, when the other side portion 42b of the claw supporting plate 42 is rotated upward centering the side portion 42a, a space between the supporting claws 43 and 44 is narrowed by the torsion spring (not shown). As shown in FIG. 5(d), the edge-shaped claw portion 46a of the engagement claw 46 is engaged with a middle portion of the holding claw 44. Between the engagement claw 46 and the barrel shaft 33, an idle pulley 47 is mounted which is rotatably attached to the vertical plate portion 39. The wire 36 is put on the idle pulley 47, and an end of the wire 36 is situated between the two side portions 42a and 42b and is fixed to the claw mounting plate 42.

Figure 6A:
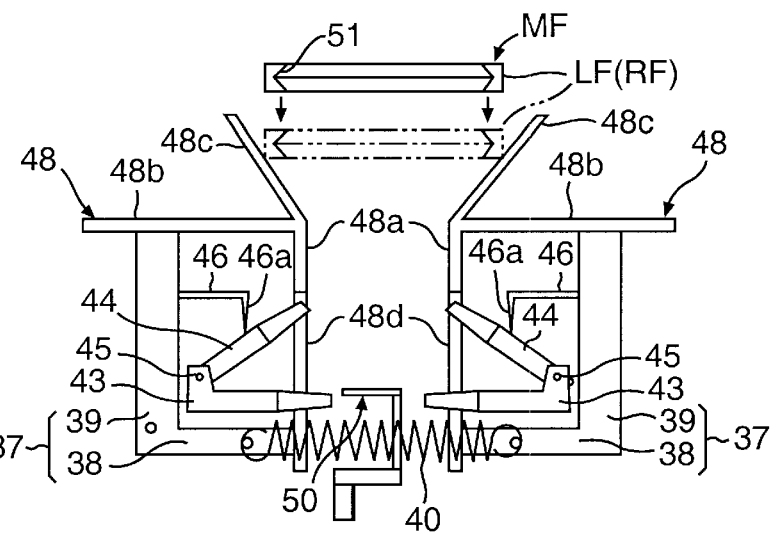
FIGS. 6(a) to 6(c) are views for explaining an eyeglass frame holding operation of the apparatus shown in FIGS. 2, 4 and 5.
Figure 6B:
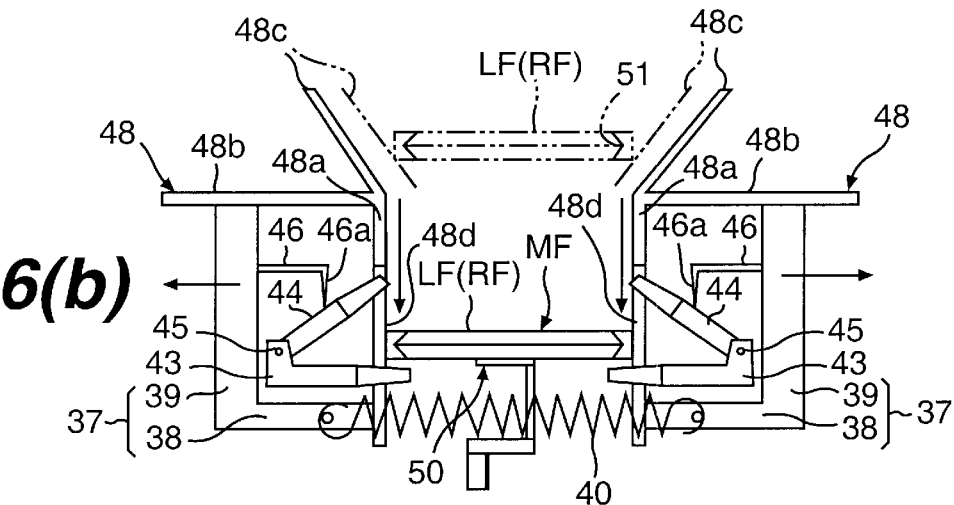

The movable supporters 37, 37 have two opposite sides which are covered with a frame guide member 48 shown in FIG. 4 and FIGS. 6(a) to 6(c). The frame guide member 48 comprises a vertical plate portion 48a fixed to a front end of the horizontal plate portion 38, a horizontal plate portion 48b fixed to an upper end of the vertical plate portion 39, and an inclined guide plate 48c connected to a corner, at which the plate portions 48a and 48b are connected to each other, and inclining to the horizontal plate portion 48b. In the vertical plate portion 48a, an aperture 48d is formed corresponding to the holding claws 43 and 44, and the holding claw 44 projects from the aperture 48d. The front end portion of the holding claw 43 is to be positioned within the aperture 48d in an open state in which the holding claws 44 and 43 are widened at its maximum, as shown in FIGS. 6(a) and 6(b).

In this construction, the inclined guide plates 48c, 48c of the frame guide members 48, 48 are inclined in a direction in which the distance between the guide plates 48c, 48c is gradually widened upward. Accordingly, when the eyeglass frame MF is placed between the inclined guide plates 48c, 48c, as shown in FIG. 6(a), and is pushed down against the force of the coil spring 40, a space between the frame guide members 48, 48 is widened by means of the inclined guide plates 48c, 48c, and the eyeglass frame MF (in more detail, the lens frame LF(RF) of the eyeglass frame MF) is moved to be engaged with the holding claws 43, 43.

Figure 6C:
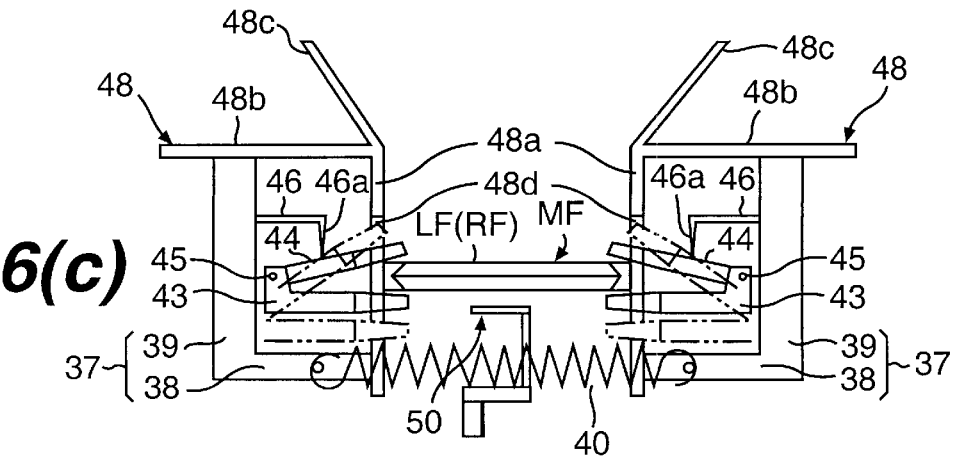

In this state, when the operation lever 27 is operated to be moved from the position "OFF" to the position "ON", this movement is transferred to the barrel shaft 33 via the rotation shaft 25, the gears 26, 24, and the operation shaft 23, and thereby part of the spring 35 is wound on the barrel shaft 33 so that via the wire 36 contacted with the spring 35, the claw mounting plate 42 is then rotated upward centering the side portion 42a, the space of the holding claws 43, 44 is then narrowed as shown in FIG. 6(c), and, as a result, the lens frame LF(RF) of the eyeglass frame MF is held between the holding claws 43, 44 as shown in FIG. 6(c). In this position, the movable pin 31 is held on the lower end 20a of the circular slit 20 by the spring 32.

In order to remove the lens frame LF(RF) of the eyeglass frame MF from the holding claws 43, 44, the operation lever 27 is operated conversely to the aforementioned operation so that the members are conversely actuated.

Measurement Portion Moving Mechanism 100

The measurement portion moving mechanism 100 comprises supporting plates 102, 103 which are fixed to a chassis 101 and are spaced in a direction where the frame holding mechanisms 15, 15' are arranged, and a guide rail 104 horizontally stretched between the upper parts of the supporting plates 102, 103. The guide rail 104 stretched therebetween is two in number, but the other one is not shown. The two guide rails 104 are arranged parallel with each other in a direction perpendicular to the figure (i.e., to the drawing sheet). FIGS. 7(a), 7(b) and FIGS. 8(a), 8(b) schematically show the measurement portion moving mechanism of FIG. 4.

The measurement portion moving mechanism 100 further comprises a slide base 105 which is held on the guide rails 104 and is freely movable to-and-fro in an extending direction (laterally in the figure) of the guide rails 104, a feed screw 106 which is held under the guide rails 104 and is rotatable around the supporting plates 102, 103, and a measurement portion moving motor 107 which drives and rotates the feed screw 106.

The feed screw 106 is placed parallel to the guide rail 104, and the motor 107 is fixed to the chassis 101. The vertical plate portion 105a extending downward is formed integrally with the slide base 105, and the feed screw 106 is screwed to the female-screw portion (not shown) of the vertical plate portion 105a. Thus, the slide base 105 can be operated to be moved laterally in FIGS. 7(a) and 7(b) by rotating the feed screw 106.

In FIGS. 7(a) and 7(b), reference numeral 108 denotes a supporting plate which is fixed to a left end of the chassis 101 and extends up and down, reference numeral 109 denotes a holder supporting piece fixed to the left of an upper end of the supporting plate 108, and reference numeral 110 denotes a micro-switch (sensor) serving as a detection means which is mounted on a side surface of a front end portion of the holder supporting piece 109. The micro-switch 110 is used to detect a lens-shaped template holder (lens-shaped template holding means) 111 which holds a lens-shaped template, such as that of a demonstration lens, and a frame-shaped template. The micro-switch 110 may be mounted on the supporter 17 or 18 of FIG. 5(a), and the micro-switch 110 may detect that the holding claws 43, 44 have held the lens-shaped template holder 111 by the contact with the movable supporters 37, 37 when the holding claws 43, 44 hold the lens-shaped template holder 111.

The lens-shaped template holder 111 consists of a template holding plate portion 111a and a template feeler erecting plate portion 111b, and is shaped like "L" in section. A template holding boss portion 111c is formed integrally with the template holding plate portion 111a and holds a lens-shaped template (frame-shaped template) 112.

In FIGS. 7(a) and 7(b), reference numeral 113 denotes a fixing screw attached to an end of the template holding plate portion 111a. When the template holding plate portion 111a is fixed to the front end of the holder supporting piece 109 by means of this screw 113, the template holding plate portion 111a is brought into contact with a sensor lever 110a of the micro-switch 110, and thereby it is detected that the lens-shaped template 112 is in a measurable state.

Frame Contour Measurement Portion 200

The frame contour measurement portion 200 shown in FIGS. 7(a) and 7(b) comprises a rotation shaft 201 which vertically passes through the slide base 105 and is rotatably held, a rotation base 202 horizontally mounted on an upper end portion of the rotation shaft 201, a timing gear 203 fixed to a lower end portion of the rotation shaft 201, a base rotating motor (pulse motor) 204 which is fixed to the slide base 105 and is adjacent to the rotation shaft 201, a timing gear 205 which is fixed to an output shaft 204a of the base rotating motor 204, and a timing belt 206 stretched between the timing gears 203 and 205. The output shaft 204a passes through the slide base 105 and projects downward. Reference numerals 207, 208 denote supporting plates projecting from the two end portions of the rotation base 202.

The frame contour measurement portion 200 comprises a measuring portion 210, measuring element positioning means 250, and pressure switching means 500. The pressure switching means 500 is not shown in FIGS. 8 and 11.

Measuring Portion 210

The measuring portion 210 comprises two guide rails (only one is shown) 211 which are horizontally laid over the supporting plates 207, 208, an upper slider 212 which is held on the guide rail 211 and is freely and horizontally movable in a longitudinal direction, a measuring shaft 213 which vertically passes through an end of the upper slider 212, a roller 214 attached to a lower end of the measuring shaft 213, an "L"-shaped member 215 mounted on an upper end of the measuring shaft 213, and a measuring element (feeler) 216 attached to an upper end of the "L"-shaped member 215. A front end of the measuring element 216 coincides with an axis of the measuring shaft 213. The measuring shaft 213 is held in the upper slider 212 where the measuring shaft 213 can move up and down and rotate freely around the shaft line.

The measuring portion 210 further comprises a vector-radius measuring means 217 which measures and outputs the amount of movement (vector radius ρi) along the guide rail 211 of the upper slider 212, and a height measuring means 218 which measures and outputs the amount of vertical movement Zi of the measuring element 216, namely the amount of up-and-down (Z-axis direction) movement of the measuring shaft 213. Means for detecting the amount of linear movement, such as a magnescale or linear sensor, can be used as the measuring means 217, 218. The constitution thereof is well known, and its description is omitted. The measuring portion 210 further comprises a lens-shaped template measuring element 219 which is semi-cylindrical in horizontally section and is disposed on the other end portion of the upper slider 212, and a rotation shaft 220 which is mounted on a projection 212a on the other end portion of the upper slider 212 for freely erecting and falling the measuring element 219 in the movement direction of the upper slider 212.

The lens-shaped-template measuring element 219 comprises an erecting drive piece 219a which is disposed on the base (near the rotation shaft 220) and juts out toward an opposite side to a measurement surface side, and a switch operating piece 219b which juts out toward a side surface of the upper slider 212. A spring 221 is arranged between the side surface of the upper slider 212 and a side surface of the base of the erecting drive piece 219a.

When the measuring element 219 is laid down as shown in FIG. 7(a), the spring 221 is situated above the rotation shaft 220 and keeps the measuring element 219 at the laid-down position. When the measuring element 219 is erected as shown in FIG. 7(b), the spring 221 is situated under the rotation shaft 220 and keeps the measuring element 219 at the erected position. This construction makes up the measuring element holding means for holding the measuring element 219 at both of the laid-down position and the erected position.

At the erected position, the measuring element 219 does not fall to the right side in FIGS. 7(a) and 7(b) by means of a not-shown stopper. On the side surface of the upper slider 212, a micro-switch (sensor) 222 used as detection means for detecting that the measuring element 219 is laid down, and a micro-switch (sensor) 223 used as detection means for detecting that the measuring element 219 is erected.

In FIG. 7(a), when the motor 107 for moving the measurement portion is actuated and the slide base 105 is moved leftward in FIGS. 7(a) and 7(b), a front end of the erecting drive piece 219a is brought into contact with a plate portion (engagement portion for erecting the template feeler) 111b for erecting the lens-shaped-template feeler of the holder 111, and the measuring element 219 is rotated clockwise around the rotation shaft 220 against the force of the spring 221. Correspondingly to this rotation of the measuring element 219, the spring 221 goes beyond the rotation shaft 200 and moves upward, and the measuring element 219 is erected by the force of the spring 221, and is held at the erected position shown in FIG. 7(b) by the stopper (not shown) and the spring 221, That is, the motor 107 is a driving device not only for erecting the measuring element 219 but also for measuring the right and left lens frames of the eyeglass frame. The erecting drive piece 219a and the feeler erecting plate portion 111b make up form the feeler erecting means (measuring element positioning means).

The micro-switch 222 is directly switched "ON" with the measuring surface of the measuring element 219 when the measuring element 219 is laid down, and is switched "ON" with the switch operation piece 219a when the measuring element 219 is erected. Reference numeral 208a denotes a slider stopper (slider stopper surface) mounted on the supporting plate 208, reference numeral 224 denotes an arm attached to the supporting plate 208, and reference numeral 225 denotes a microswitch (sensor) as detecting means mounted on a front end of the arm 224. The micro-switch 225 is switched "ON" when the upper slider 212 comes into contact with the slider stopper 208a, and detects an initial position of the upper slider 212.

On the side surface of the upper portion of the supporting plate 207, a pulley 226 is held rotatably, and an end of a wire 227 is fixed to an end of the upper slider 212. The other end of the wire 227 is engaged with an end of the spring 228 used as pressing means, and the other end of the spring 228 is mounted on a regulation slider 501 (mentioned later, see FIG. 14). Additionally, the wire 227 is laid on the pulley 226. Since the rotation center is eccentric, the pulley 226 can cancel the increase in tension of the spring 228 which is caused by the movement of the measuring element 216.

Measuring Element Positioning Means 250

The measuring element positioning means 250 comprises two guide rails 251 (one of which is not shown) which are horizontally laid under the supporting plates 207, 208, a lower slider 252 which is held on the guide rails 251 to be horizontally movable in a longitudinal direction, a driving motor 253 which is disposed under the lower slider 252 and is fixed to the rotation base 202, and an engagement pin (stopper) 254 which is adjacent to the driving motor 253 and juts out from near the center of a side surface of the rotation base 202.

Racks 255 are arranged in its movement direction under the lower slider 252, and engagement pins (stoppers) 256, 257 are spaced in the movement direction and are caused to jut out from the lower slider 252. A gear 258 engaged with the racks 255 is fixed to an output shaft of the driving motor 253. The engagement pin 256 is situated slightly higher than the engagement pin 257, and a shaft elevation operating member 259 is disposed on a side of the lower slider 252.

The shaft elevation operating member 259 is shaped like "L" which consists of a long piece 259a which is between the engagement pins 256, 257 and a short piece 259b which is obliquely formed integrally with the lower end of the long piece 259a. A curved part of the operating member 259 is rotatably held on a vertically middle portion of a side surface of the lower slider 252. A spring 261 is arranged between a front end of the short piece 259b and an upper portion of the side surface of the lower slider 252.

At a position where the long piece 259a is in contact with the engagement pin 256, the spring 261 is disposed right from the rotation shaft 260 and presses the long piece 259a against the engagement pin 256. At a position where the long piece 259a is in contact with the engagement pin 257, the spring 261 is disposed left from the rotation shaft 260 and presses the long piece 259a against the engagement pin 257.

A supporting plate 262 extending upward is attached to an end of the lower slider 252, and a pushing shaft 263 passing through an upper end of the supporting plate 262 is held on the supporting plate 262 so as to proceed and recede in a movement direction of the lower slider 252. A retainer 264 for preventing release is attached to an end of the pushing shaft 263. A large-diameter pushing portion 263a, which faces an end surface 212b of an end of the upper slider 212, is formed integrally with the other end of the pushing shaft 263. A spring 265 wound on the pushing shaft 263 is arranged between the large-diameter pushing portion 263a and the supporting plate 262. The pushing portion 263a is in contact with the end surface of the end of the upper slider 252 by means of the springs 228, 265. The driving motor 253, racks 255, supporting plate 262, pushing shaft 263, spring 265, etc. make up the slider driving means.

The thus constructed measuring apparatus 1 is, as mentioned later, capable of obtaining the contour of the eyeglass frame MF or the contour of the lens-shaped template in the form of vector radius ρi relative to angle θi, in other words, in the form of lens contour information (θi, ρi) representing polar coordinates Pressure Switching Means 500

Figure 14A:
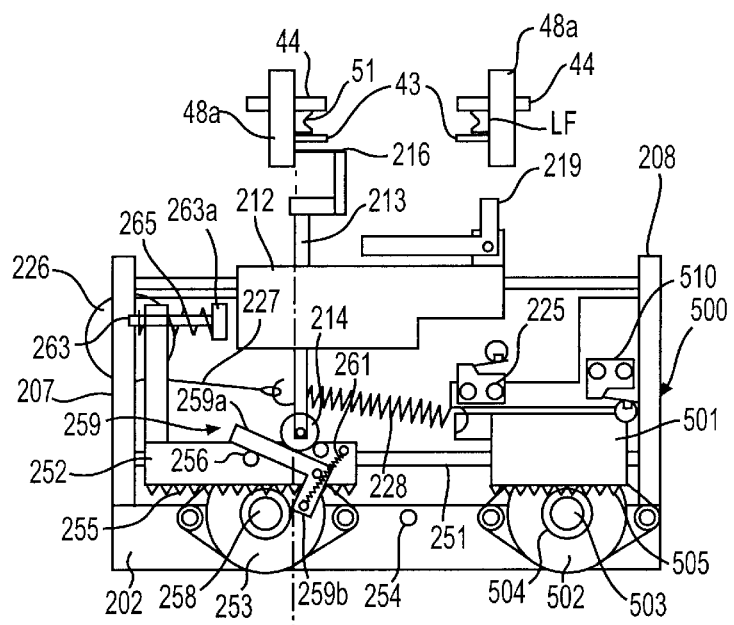
FIG. 14(a) is a schematic view showing a means for switching pressure.
Figure 14B:
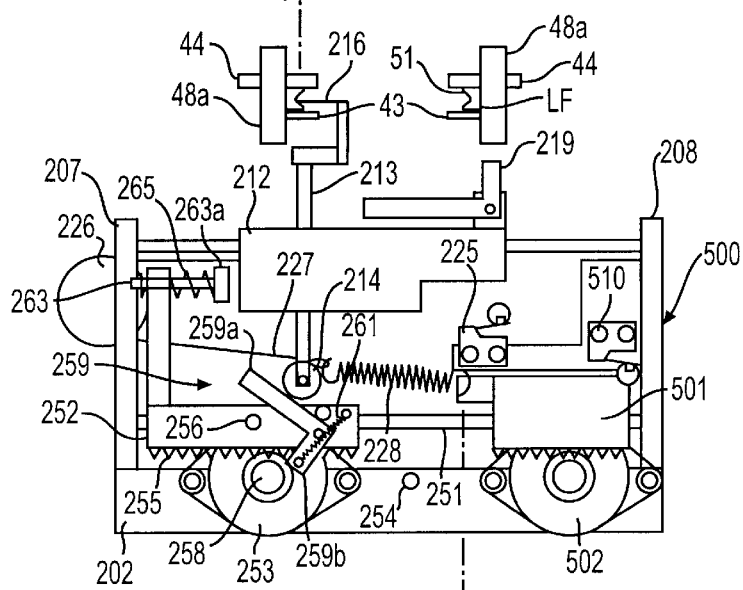
FIG. 14(b) is a schematic view showing a state in which the pressure is set at normal.
Figure 14C:
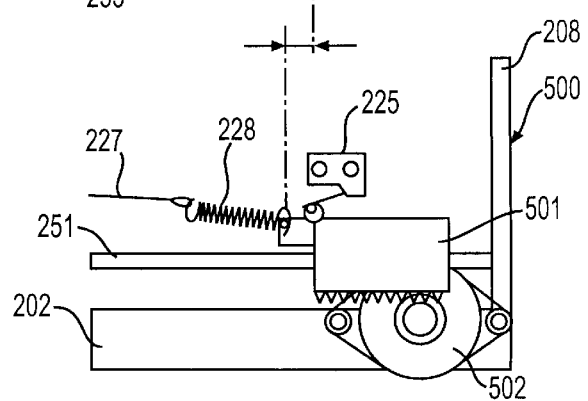
FIG. 14(c) is a schematic view showing a state in which the pressure is set at weak.

As shown in FIGS. 14(a) to 14(c), the pressure switching means 500 comprises a regulation slider 501 which is mounted movably along the guide rail 251, and a motor 502 which moves the regulation slider 501 along the guide rail 251. A gear 504 is attached to a driving shaft 503 of the motor 502 and is engaged with racks 505 formed in an under surface of the regulation slider 501.

The pressure switching means 500 switches the length of the spring 228 by moving the regulation slider 501 along the guide rail 251 to a predetermined position by means of the motor 502. By switching the length of the spring 228, the pressure that the measuring element 216 applies to the lens frame. LF(RF) is switched.

When the regulation slider 501 is situated at a position shown in FIG. 14(b), normal pressure is applied to the lens frame LF(RF) by means of the measuring element 216. At this time, a micro-switch 510 detects the position of the regulation slider 501 and switches "ON". When the regulation slider 501 is situated at a position shown in FIG. 14(c), the length of the spring 228 becomes short, and thereby pressure weaker than the normal pressure is applied to the lens frame LF(RF) by means of the measuring element 216. At this time, a micro-switch 511 detects the position of the regulation slider 501 and switches "ON". The microswitches 510, 511 are mounted on a not-shown supporter between the supporting plates 207, 208.

Figure 16:
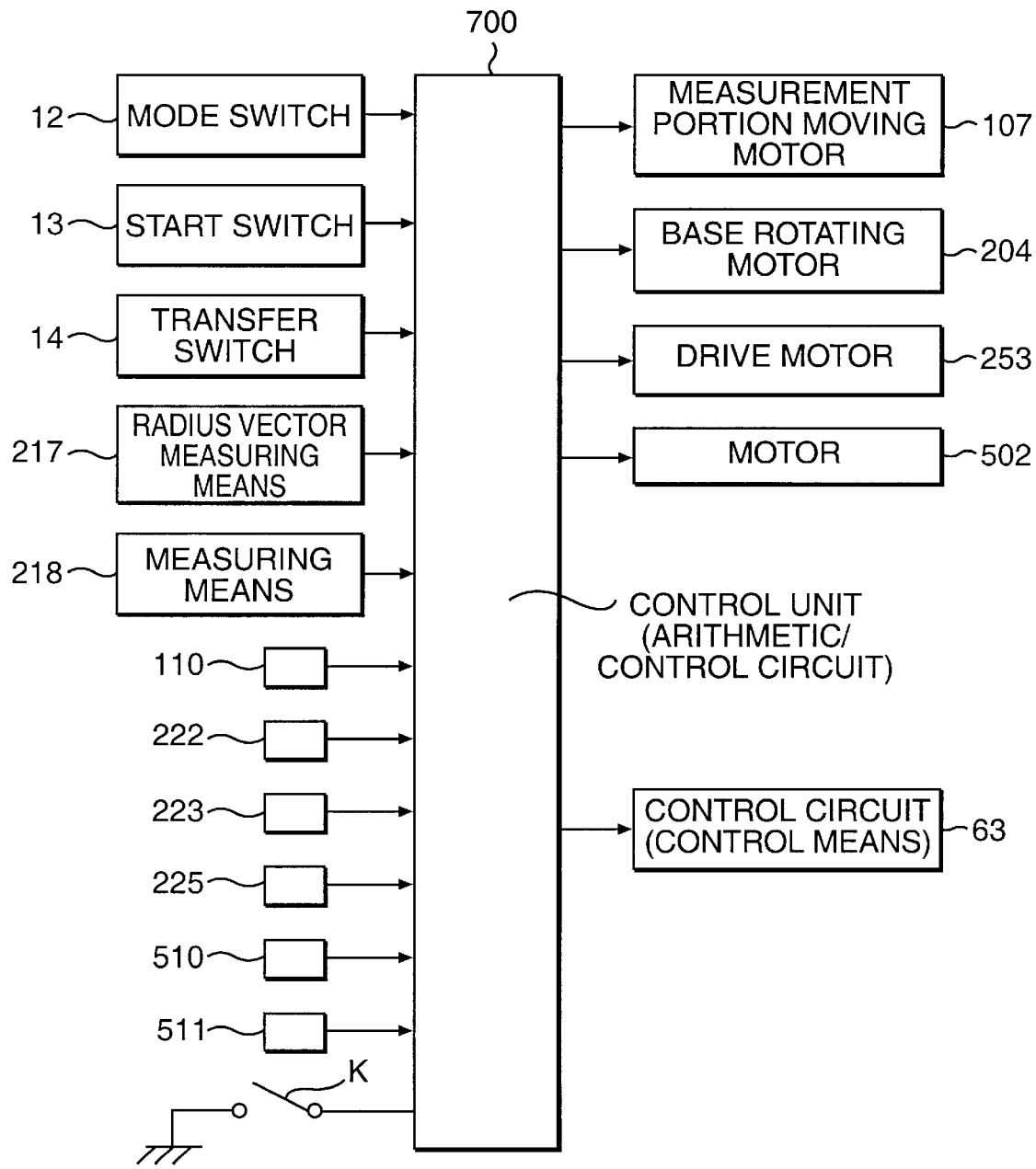
FIG. 16 is a block diagram showing a control system.

FIG. 16 is a block diagram showing a construction of a control system for controlling the motors 107, 253, 502, etc. In this figure, reference numeral 700 denotes a control device which comprises a CPU serving as arithmetic and control means (arithmetic and control circuit), i.e., serving as the measuring element positioning means. The control unit 700 receives ON and OFF signals output from a mode-switch 12, start-switch 13, transfer-switch 14, keyswitch K (rim-thickness measurement mode setting switch), micro-switches 110, 222, 223, 225, 510, 511, etc. At the same time, the control unit 700 receives signals output from the radius vector measuring means 217 and the measuring means 218. The control unit 700 controls the motors 107, 204, 253, 502, etc., based on the signals from the abovementioned switches 12, 13, 14, K, 110, 222, 225, 510, 511, etc. The details of the control will be described later. The control unit 700 also calculates the thickness of the rim, based on information measured by the radius vector measuring means 217, and determined whether the thickness of the rim is thin or not, and further controls and drives the motor 502, based on a determination result. These controls and actions thereof will be described later.

(2) Lens Edging Apparatus 2

As shown in FIG. 2, the lens edging apparatus 2 includes a grinding portion 60 (details not depicted) that grinds the edge of an uncut lens. In the grinding portion 60, the uncut lens is held between a pair of lens-rotating shafts of a carriage, and the rotation of the shafts and the up and down movement of the carriage are controlled based on lens contour information (θi, ρi), and thus the edge of the uncut lens is ground with a grindstone. Since this structure of the grinding portion 60 is well known, a detailed description thereof is omitted.

The lens edging apparatus 2 further includes an operation panel portion (keyboard) 61 serving as a data input means, and a liquid crystal display panel (display device) 62 serving as a display means, and a control circuit (control means) 63 (see FIG. 1) that controls the grinding portion 60 and the liquid crystal display panel 62.

Figure 9:
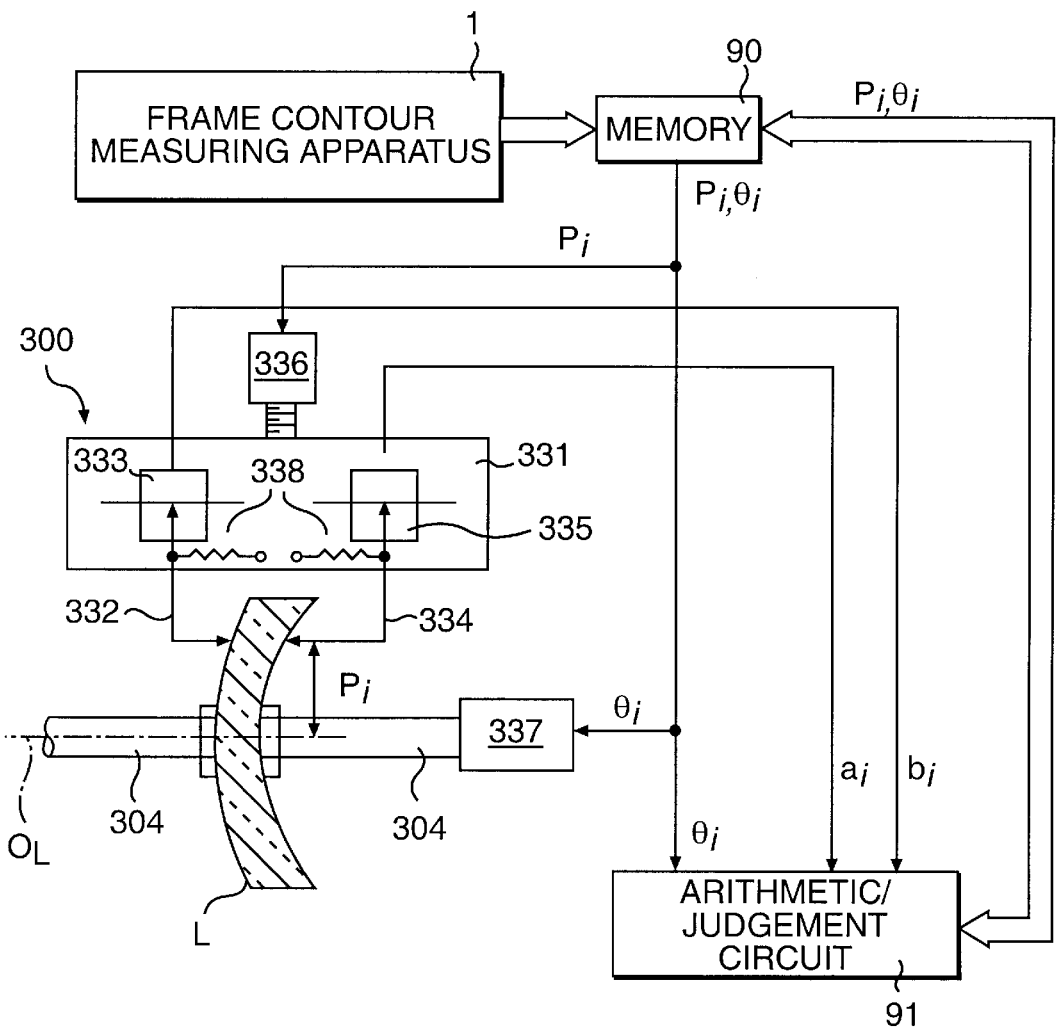
FIG. 9 is a view for explaining a lens-thickness measuring portion of a lens edging machine shown in FIG. 2.

The lens edging apparatus 2 further includes a lens thickness measuring device 300 (lens thickness measuring means) that measures the thickness of the edge of the uncut lens, based on lens contour information (θi, ρi) obtained by the frame contour measuring apparatus 1, as shown in FIG. 9. The construction and operation of the lens thickness measuring device 300 are the same as those disclosed in Japanese Patent Application No. Hei 1-9468.

Lens Thickness Measuring Means

Figure 10:
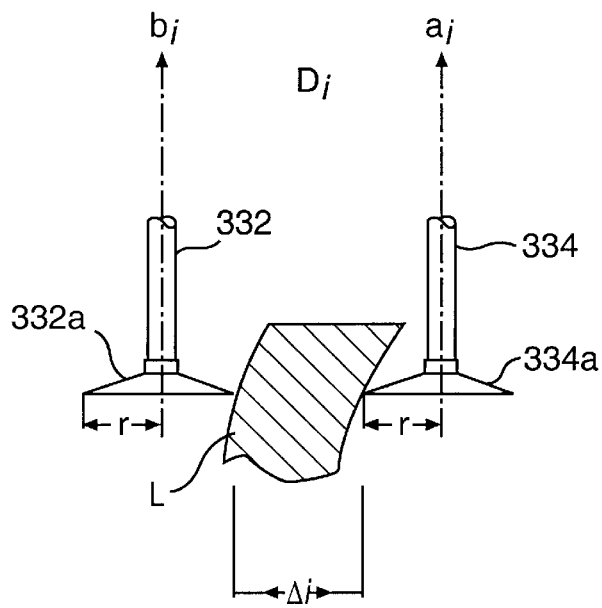
FIGS. 10(a) to 10(c) are views for explaining the operation of feelers shown in FIG. 9.
Figure 10:
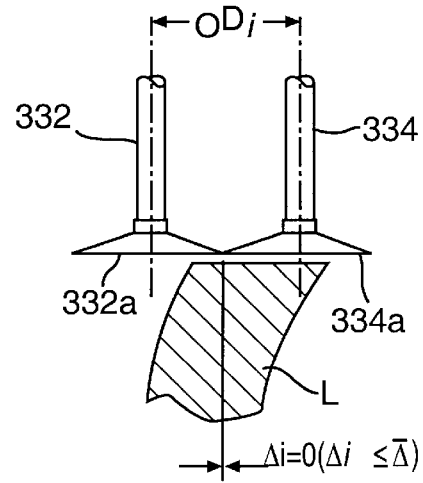
Figure 10:
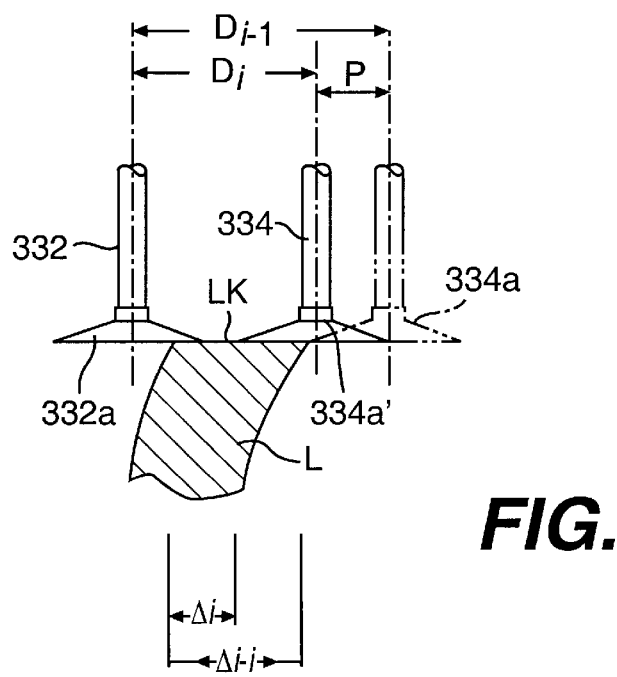

The lens thickness measuring device 300 has a stage 331 that is moved forwards and backwards by a pulse motor 336. The stage 331 is provided with feelers 332, 334 between which the uncut lens L is placed. The feelers 332, 334 are pressed in directions in which they approach each other by means of the force of springs 338, 338 so as to be always in contact with front and back surfaces (front and back refracting surfaces) of the uncut lens L, respectively. As shown in FIG. 10(A), the feelers 332, 334 have disks 332a, 334a that are freely rotatable, respectively. The disks 332a, 334a each have a radius of r. Lens rotating shafts 304, 304 of a carriage (not shown) are disposed to be driven and rotated by a pulse motor 337, and the uncut lens L is clamped between the lens rotating shafts 304, 304. Accordingly, the uncut lens L is driven and rotated by the pulse motor 337. The optical axis OL of the lens L is caused to coincide with the axial line of the lens rotating shafts 304, 304. Angular information θi' of radius vector information (ρi, θi) from a memory 90 is input into the pulse motor 337, and, according to the angular information θi', the lens L is rotated from a reference position by an angle of θi. On the other hand, the radius vector length ρi is input into the pulse motor 336, and the disks 332a, 334a of the feelers 332, 334 are moved forwards and backwards through the stage 331 and are positioned at points away from the optical axis OL by the radius vector length ρi, as shown in FIG. 9. The quantities ai and bi, shown in FIG. 10 (A), of movement of the feelers 332, 334 at the points are then detected by encoders 333, 335, and detection signals from the encoders 333, 835 are input into an arithmetic/judgment circuit 91.

The arithmetic/judgment circuit 91 performs a calculation according to the formulas bi−ai=Di, Di−2r=Δi, and obtains a lens thickness Δi.

Control Means, etc.

Figure 3:
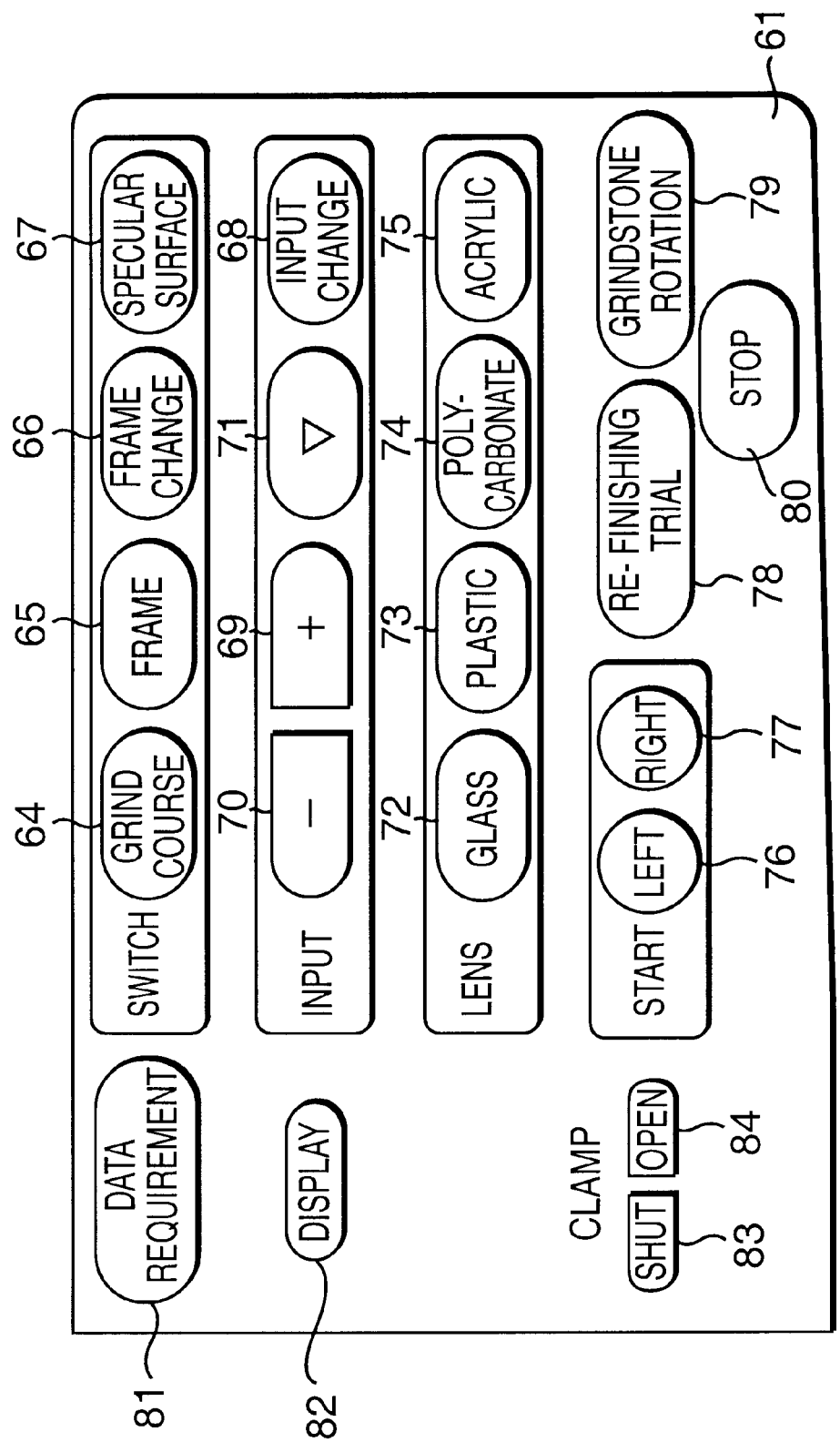
FIG. 3 is an enlarged explanation view of a control panel shown in FIGS. 1 and 2.

As shown in FIG. 3, the operation panel portion 61 has a grind course switch 64 for making a changeover among an "auto" mode in which the edge and V-edge of a lens are ground, a "monitor" mode of a manual operation, etc., a "frame" mode switch 65 for selecting the material of an eyeglass frame, a "frame change" mode switch 66 for putting old lenses into a new eyeglass frame without discarding the old lenses, and a "specular surface" mode switch 67 for specularly processing eyeglass lenses.

The operation panel portion 61 further has an "input change" mode switch 68 for a pupil distance PD, a frame geometric center distance FPD, an upset UP, etc., a "+" input switch 69 for setting a "+ (plus)" input, a "−" input switch 70 for setting a "− (minus)" input, a cursor key 71 for moving a cursor symbol 71a, a switch 72 for selecting glass as lens material, a switch 73 for selecting plastic as lens material, a switch 74 for selecting polycarbonate as lens material, a switch 75 for selecting acrylic resin as lens material.

The operation panel portion 61 further has a start switch including a switch 76 for grinding a "left" lens and a switch 77 for "grinding a right" lens, a "re-finishing/trial" mode switch 78, a "grindstone rotation" switch 79, a stop switch 80, a data requirement switch 81, a display switch 82, a switch 83 for shutting the pair of clamping shafts of the grinding portion 60, a switch 84 for opening the pair of clamping shafts of the grinding portion 60, a switch for starting the measurement of a lens thickness a setting switch. The switch 76 for grinding a left lens and the switch 77 for grinding a right lens can also be used as the switch for starting the measurement of a lens thickness and the setting switch, respectively, because both of the switches 76 and 77 are designed to start the measurement of a lens thickness and the setting operation, and to start to grinding left and right lenses, respectively, after, the measurement and setting operation.

Figure 1:
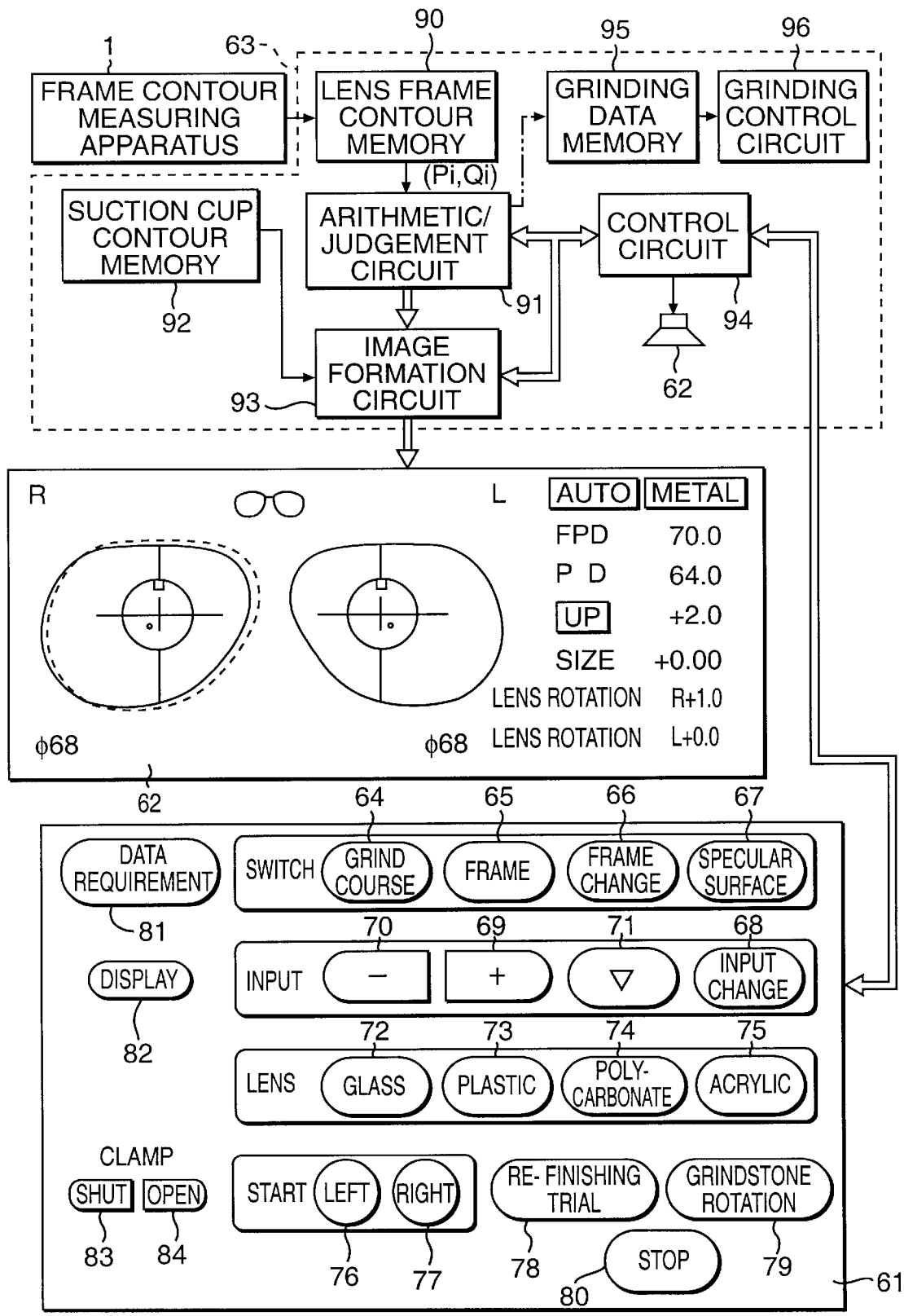
FIG. 1 shows a control circuit of an apparatus capable of determining whether or not an eyeglass lens is suitable to be ground.

As shown in FIG. 1, the control circuit 63 includes a lens frame contour memory 90 that stores lens contour information (θi, ρi) obtained from the frame contour measuring apparatus 1, the arithmetic/judgment circuit 91 into which the lens contour information (θi, ρi) is input from the lens frame contour memory 90, a suction cup contour memory 92, an image formation circuit 93 in which image data is constructed based on the data obtained from the arithmetic/judgment circuit 91 and from the suction cup contour memory 92 and thereby a liquid crystal display panel 62 is caused to display images and data, an operation panel portion 61, a control circuit 94 that controls a caution buzzer, etc., by control commands of the arithmetic/judgment circuit 91, a grinding data memory 95 that stores grinding data obtained by the arithmetic/judgment circuit 91, and a grinding control portion 96 that controls the operation of the grinding portion 60 in accordance with the grinding data stored in the grinding data memory 95.

A description will next be given of the control performed by the arithmetic/judgment circuit 91 and a control unit 700 of the thus constructed apparatus.

(i) Setting of an Eyeglass Frame MF in the Frame Contour Measuring Apparatus 1

When the contour of the eyeglass frame MF is measured according to the aforementioned construction, a lens holder 111 shown in FIGS. 7(a) to 8(b) is kept removed from a holder supporter 109. In this construction, inclined guide plates 48c, 48c of frame guide members 48, 48 are inclined in a direction in which a space between them becomes progressively larger toward their upper ends.

Accordingly, as shown in FIG. 6(a), the eyeglass frame MF is disposed between the guide plates 48c, 48c and is then pressed from above against the force of a coil spring 40. As a result, the apace between the frame guide members 48, 48, namely, the space between movable supporters (sliders) 37, 37 is enlarged according to the guide function of the guide plates 48c, 48c, and thereby the rim of the eyeglass frame MF, namely, the lens frame LF (RF) of the eyeglass frame MF is moved onto holding claws 43, 43 and is fixedly held by the holding claws 43, 43.

In this state, an operation lever 27 is turned from the position "open" to the position "close". This turn is transmitted to a drum shaft 33 through a rotation shaft 25, gears 26, 24, and an operation shaft 23, and thereby a part of a spring 35 is wound around the drum shaft 33. Accordingly, a claw mounting plate 42 is turned upwards centering a side 42a of the plate 42 through a wire 36 connected to the spring 35, and the space between the claws 43, 44 is reduced as shown in FIG. 6(c). As a result, the lens frame LF (RF) is held between the claws 43, 44. At this position, a movable pin 31 is held at a lower portion 20a of a circular slit 20 by means of the force of a spring 32.

In order to remove the lens frame LF (RF) of the eyeglass frame MF from between the claws 43, 44, the operation lever 27 is operated reversely to the above-mentioned operation, and thereby each member operates reversely.

(ii) Lens Frame Contour Measurement

Measurement of the Contour of a Lens Frame of an Eyeglass Frame

On the other hand, when an electric power supply of the frame contour measuring apparatus 1 is turned on, signals from micro switches 110, 222, 223, 225 are input into the control unit 700 of the frame contour measuring apparatus 1, and the control unit 700 judges detection states of the micro switches 110, 222, 223, 225.

Figure 11A:
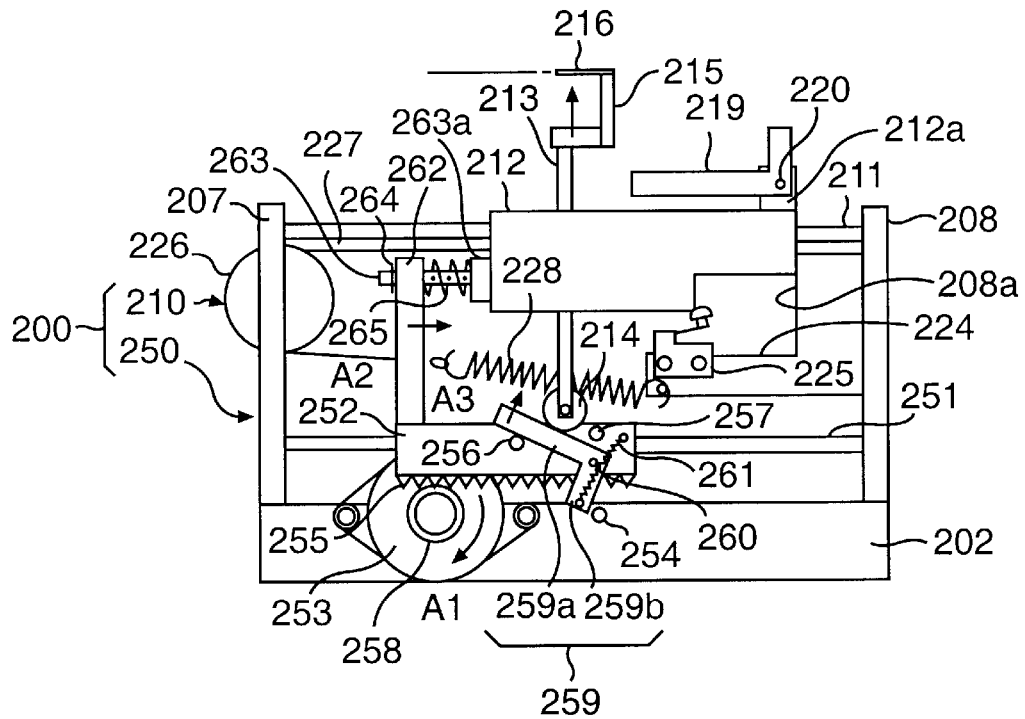
FIGS. 11(a) to 11(c) are views for explaining the operation of the measuring portion of the measuring apparatus.
Figure 11B:
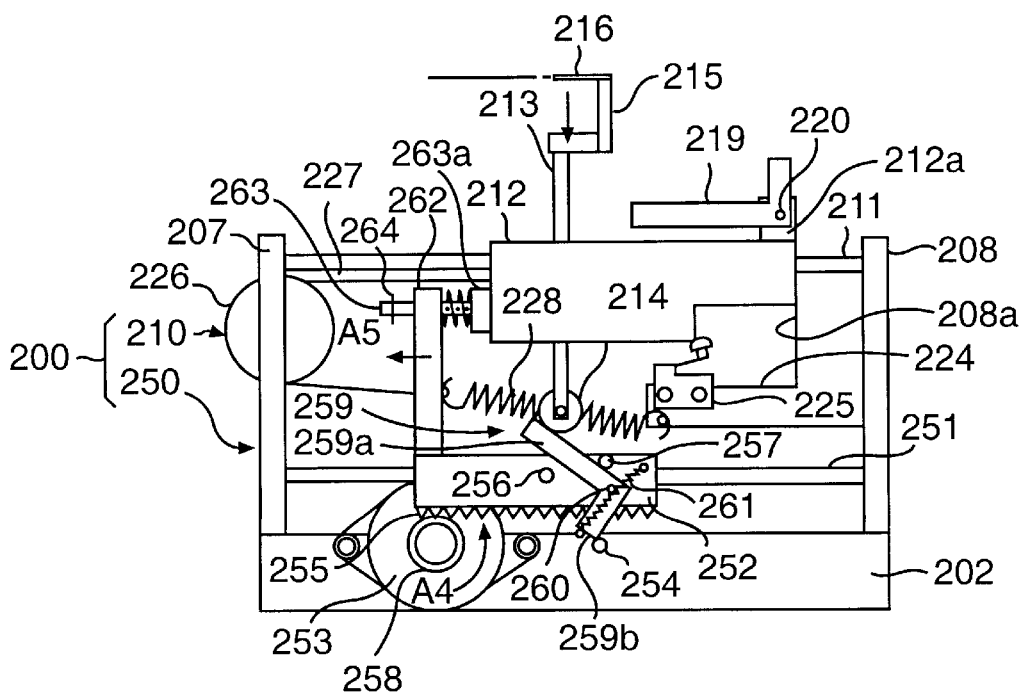

In FIG. 11(a), a long portion 259a of a shaft elevation operating member 259 is in contact with a stopper pin 257 by the elastic force of a spring 261. In this state, a measuring element 216 is located at a stand-by position ($\alpha$). In the following description, measurement is set, for example, such that the lens frame RF of the eyeglass frame MF is measured after the measurement of the lens frame LF thereof is completed.

When a start switch 13 is turned on in a state in which, as mentioned above, the lens frame LF (RF) is kept held between the claws 43, 44, the control unit 700 actuates and controls the drive motor 107. The operation of the drive motor 107 leads to the rotation of a feed screw 106, and thereby a slide base 105 and a rotation base 202 are moved rightward, and the measuring element 216 is moved to the middle of the lens frame LF (RF).

The control unit 700 then actuates a drive motor 253, and, as shown by arrow A1, rotates a gear 258 clockwise, and thereafter moves a lower slider 252 rightward in FIG. 11(a), and, as shown by arrow A2, moves an upper slider 212 by means of a pressure shaft 263 rightward in the figure.

At this time, a short portion 259b of the shaft elevation operating member 259 is brought into contact with a stopper pin 254, and the shaft elevation operating member 259 is rotated clockwise centering a rotation shaft 260, as shown by arrow A3.

Correspondingly to this movement, the spring 261 moves to the right side of the rotation shaft 260, and the shaft elevation operating member 259 is abruptly rotated by the elastic force of a spring 261. As a result, the long portion 259a of the shaft elevation operating member 259 collides with the stopper pin 254. Because of the abrupt movement of the shaft elevation operating member 259, a measurement shaft 213 is pushed up through a roller 214 from the stand-by position ($\alpha$) to the leap position ($\beta$). Thereafter, the measurement shaft 213 and the measuring element 216 slightly move down, and the roller 214 comes into contact with the long portion 259a, and thereby the measuring element 216 is situated at measuring-element insertion position (feeler insertion position)($\gamma$) to face a valley of the V-shaped groove of the lens frame LF. When the shaft elevation operating member 259 is brought into contact with the roller 214 and thereby the measuring element 216 is pushed up to the leap position ($\beta$), the measuring element 216 is directed to be aligned with the normal line of the V-shaped groove 51 of the lens frame LF because the front end of the measuring element 216 is directed in a direction perpendicular to the longitudinal direction of the roller 214. Thus, in the measuring-element insertion position ($\gamma$), the measuring element 216 is smoothly brought into contact with the V-shaped groove 51. When the upper slider 212 is moved up and thereby the measuring element 216 is situated at the measuring-element insertion position ($\gamma$), the upper slider 212 turns on the micro switch 225 Thereby, the drive motor 253 is reversed, the gear 258 is then rotated counterclockwise as shown by arrow A4 in FIG. 11(b), the lower slider 252 is then moved leftward as shown by arrow A5, and the front end of the measuring element 216 is engaged with the valley (center) of the V-shaped groove 51 of the lens frame LF.

The shaft elevation operating member 259 is rotated counterclockwise centering the rotation shaft 260 a stopper pin (not shown) that juts out of the side surface of the rotation base 202 and is spaced by a given distance away from the stopper pin 254 jutting out of the same surface. Thereby, the measurement shaft 213 of the measuring element 216 reaches a state of floating in the air. This prevents the roller 214 of the measurement shaft 213 from colliding with the shaft elevation operating member 259.

Thereafter, when the lower slider 252 is further moved leftward as shown by arrow A5, the pressure part 263a of the pressure shaft 263 is caused to recede from the upper slider 212 as shown in FIG. 8 (b). In this position, the measuring element 216 is pressed to the valley of the V-shaped groove 51 of the lens frame LF by means of the elastic force of the spring 228.

In this state, the control unit 700 drives and controls a base rotating motor 204 by means of a driving pulse, so that the front end of the measuring element 216 is moved along the V-shaped groove 51 of the lens frame LF. Correspondingly to this movement, the upper slider 212 is moved along a guide rail 211 according to the contour of the V-shaped groove, and the measurement shaft 213 is moved upward or downward according to the contour of the V-shaped groove. In addition, the control unit 700 calculates the angle of rotation of the base rotating motor 204, i.e., the angle $\theta i$ of rotation of the measurement shaft 213, based on the driving pulse of the base rotating motor 204. Thereafter, the movement of the upper slider 212 is detected by a radius vector measuring means 217, and the up and down movement of the measurement shaft 213 is detected by a measuring means 218. Note that the radius vector measuring means 217 calculates the quantity of movement of the upper slider 212 starting from the position where the upper slider 212 is in contact with a stopper 208a of a supporting plate 208. The outputs of the measuring means 217, 218 are input to the control unit 700 functioning as an arithmetic and control circuit.

The control unit 700 calculates a radius vector $\rho i$ of the valley of the V-shaped groove 51 of the lens frame LF, based on the output from the measuring means 217, and allows a memory (not shown) to store radius vector information ($\theta i$, $\rho i$) obtained by correlating the radius vector $\rho i$ with the rotation angle $\theta i$ of the base rotating motor 204. On the other hand, the arithmetic and control circuit calculates the quantity $Z i$ of movement in the up and down direction (i.e., Z-axis direction), based on the output from the measuring means 218, and allows the memory (not shown) to store lens frame contour information ($\theta i$, $\rho i$, $Z i$) obtained by correlating the quantity $Z i$ of movement with both the rotation angle $\theta i$ and the radius vector $\rho i$.

Measurement of a Rim Thickness

Figure 11C:
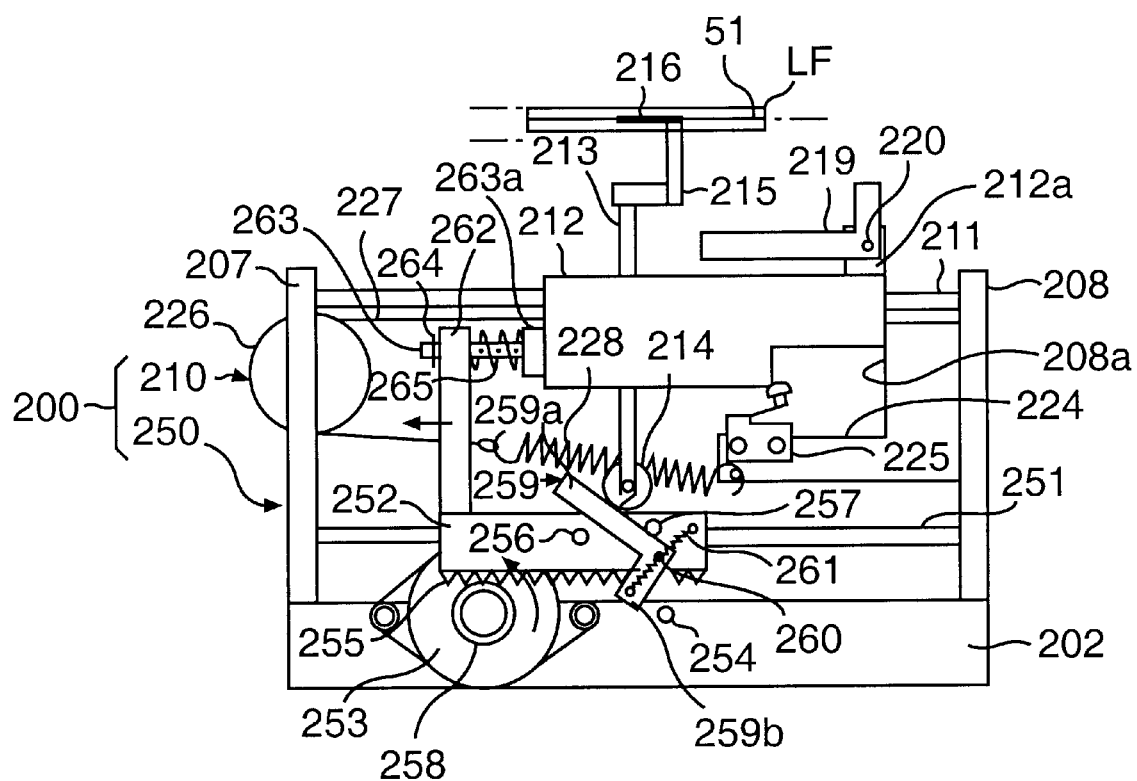

When a rim thickness measuring mode is set by operating a key switch K, the control unit 700 drives and controls the motor 253 to move the lower slider 252 from the position shown in FIG. 11(*a*) or 11(*b*) to the position shown in FIG. 14(*a*). Correspondingly to the movement of the lower slider 252, the upper slider 212 is moved leftward along the guide rail 211 by means of the force of the spring 228. Correspondingly to the movement of the upper slider 212, the measuring element 216 is brought into contact with a plate part 48*a* (see FIGS. 4 and 6) of the frame guide member 48. The quantity H1 of movement of the upper slider 212 along the guide rail 211 at this time is measured by the measuring means 217.

Thereafter, the control unit 700 drives and controls the motor 253 and, in the same way as described above, situates the measuring element 216 at the measuring-element insertion position (γ) where the measuring element 216 faces the valley of the V-shaped groove 51 of the lens frame LF (see FIG. 11(*c*)).

Thereafter, when the micro switch 225 is turned on by means of the upper slider 212 in the same way as described above, the control unit 700 receives this on-signal, thereby reversing the drive motor 253 and rotating the gear 258 counterclockwise as shown by arrow A4 in FIG. 11(*b*). Correspondingly to this movement, the lower slider 252 is moved leftward as shown by arrow A5 and thereby the upper slider 212 is moved along the guide rail 211. As a result, as shown in FIG. 14(*b*), the front end of the measuring element 216 is engaged with the V-shaped groove 51 of the lens frame LF. At this time, the movement of the upper slider 212 is stopped.

The quantity H2 of movement of the upper slider 212 during this time is measured by the radius vector measuring means 217, and a measurement signal from the measuring means 217 is input to the control unit 700. Based on the measurement signal, the control unit 700 calculates a thickness (i.e., rim thickness) H1−H2=H3 in radius vector direction of the lens frame LF. If the resulting rim thickness H3 exceeds a predetermined value, the control unit 700 directly proceeds to a step in which the contour of the lens frame LF is measured.

If the rim thickness H3 is below the predetermined value, in other words, if the lens frame LF is a thin rim, the control unit 700 drives and controls a motor 502, and moves an adjustment slider 501 leftward as shown in FIG. 14(*c*), When the adjustment slider 501 is moved to a predetermined position and thereby a micro switch 511 is turned on, the control unit 700 receives this on-signal and stops driving the motor 502.

Because of the leftward movement of the adjustment slider 501, the length of the spring 228 is shortened, and therefore pressure weaker than normal pressure by the measuring element 216 is applied onto the lens frame LF(RF). Thereafter, the control unit 700 proceeds to the step for measuring the contour of the lens frame LF in a state in which the pressure is set to be weaker even in the situation of a thin rim. For this reason, the lens frame LF is prevented from being deformed during the measurement, and therefore the contour of the lens frame LF can be accurately measured.

In this embodiment, the rim thickness can be measured in the rim thickness measuring mode which is selected by operating the key switch. Instead of manually setting the rim thickness measuring mode, the rim thickness may be automatically measured when the contour of the lens frame is measured.

Measurement of the Contour of a Lens-shaped Template Such as a Demonstration Lens In a case in which the contour of a lens-shaped template, such as that of a demonstration lens, is measured by the use of a template holder 111 as shown in FIG. 7(*a*), the template holder 111 is fixed to a supporting piece 109 through a securing screw 113. Accordingly, a sensitive lever 113*a* of the micro switch 110 is turned on by the template holder 111, and the resulting on-signal is input to the control unit 700, and thereby the control unit 700 judges the measurement of the contour of the lens-shaped template by the use of the template holder 111. Thereafter, when the start switch 13 is turned on, the control unit 700 actuates a motor 107 for moving a measuring portion, thereby moving the slide base 105 leftward in FIGS. 7(*a*) and 7(*b*). Correspondingly to this movement, the end of an erected and driven piece 219*a* is brought into contact with a template feeler erecting plate 111*b* of the template holder 111, and thereby a template measuring element 219 is rotated clockwise around a rotary shaft 220 against the elastic force of a spring 221. At this time, a micro switch 222 is turned off. This off-signal is input to the control unit 700.

When the spring 221 is moved upward beyond the rotary shaft 220 correspondingly to the rotation of the template measuring element 219, the template measuring element 219 is erected by the force of the spring 221, and is held at an erected position, as shown in FIG. 7(*b*), by the action of a stopper (not shown) and the spring 221. In this position, the micro switch 223 is turned on by a switch operating piece 219*b* of the template measuring element 219, and the resulting on-signal is input to the control unit 700.

The control unit 700 receives the on-signal from the micro switch 223, thereby actuating the drive motor 253 and rotating the gear 258 counterclockwise and thereafter moving the lower slider 252 leftward. As a result, the pressure part 263*a* of the pressure shaft 263 is caused to recede from the lower slider 252 as shown in FIG. 8(*a*). Correspondingly to this movement, the upper slider 212 is moved leftward by the force of the spring 228, and the measuring surface of the template measuring element 219 is brought into the edge of a lens-shaped template 112, as shown in FIG. 8(*a*).

In this state, the control unit 700 drives and controls the base rotating motor 204 by means of a drive pulse, and, following the edge of the lens-shaped templates 12, moves the template measuring element 219. At this time, the control unit 700 calculates the angle of rotation of the base rotating motor 204, i.e., the angle θi of rotation of the measurement shaft 213, based on the drive pulse of the base rotating motor 204. Additionally, the movement of the upper slider 212 subsequent to the rotation of the base rotating motor 204 is detected by the radius vector measuring means 217, and the output from the measuring means 217 is input to the control unit 700.

The control unit 700 calculates a radius vector ρi of the lens-shaped template 112, based on the output from the measuring means 217, and allows a memory (not shown) to store template contour information, i.e., radius vector information (θi, ρi) obtained by correlating the radius vector ρi with the rotation angle θi of the base rotating motor 204.

(iii) Measurement of the Lens Thickness of an Uncut Lens, Based on Template Contour Information When the data requirement switch 81 of the lens edging apparatus 2 is turned on, the control circuit 63 transfers template contour information, i.e., radius vector information (θi, ρi) of a lens-shaped template, such as that of a demonstration lens, which has been obtained by the frame contour measuring apparatus 1 in the same way as described above or transfers contour information (θi, ρi, Zi) of a lens frame to the lens frame contour memory 90 of the lens edging apparatus 2 and allows the memory 90 to store the information.

On the other hand, the uncut lens L is clamped between the lens rotating shafts 304, 304, and then the switch 85 is turned on. Thereby, the arithmetic/judgment circuit 91 allows a drive means (not shown) to enlarge the distance between the feelers 332, 334, and actuates the pulse motor 336 to cause the feelers 332, 334 to face the front and back refractive surfaces of the uncut lens L, respectively. Thereafter, the drive means (not shown) is stopped from enlarging the distance between the feelers 332, 334, and the feelers 332, 384 are brought into contact with the front and back refractive surfaces of the uncut lens L, respectively. Thereafter, based on the template contour information (θi, ρi, Zi) or the radius vector information (θi, ρi), the arithmetic/judgment circuit 91 actuates the pulse motor 337 so as to rotate the lens rotating shafts 304, 304 and rotate the uncut lens L, and, at the same time, actuates and controls the pulse motor 336. At this time, the arithmetic/judgment circuit 91 calculates a lens thickness Δi in the template contour information (θi, ρi, Zi) or the radius vector information (θi, ρi), based on the output from the encoder 335, and then allows the grinding data memory 95 to store the lens thickness Δi.

(iv) Display of the Cross Section of a Lens Edge

Figure 12:
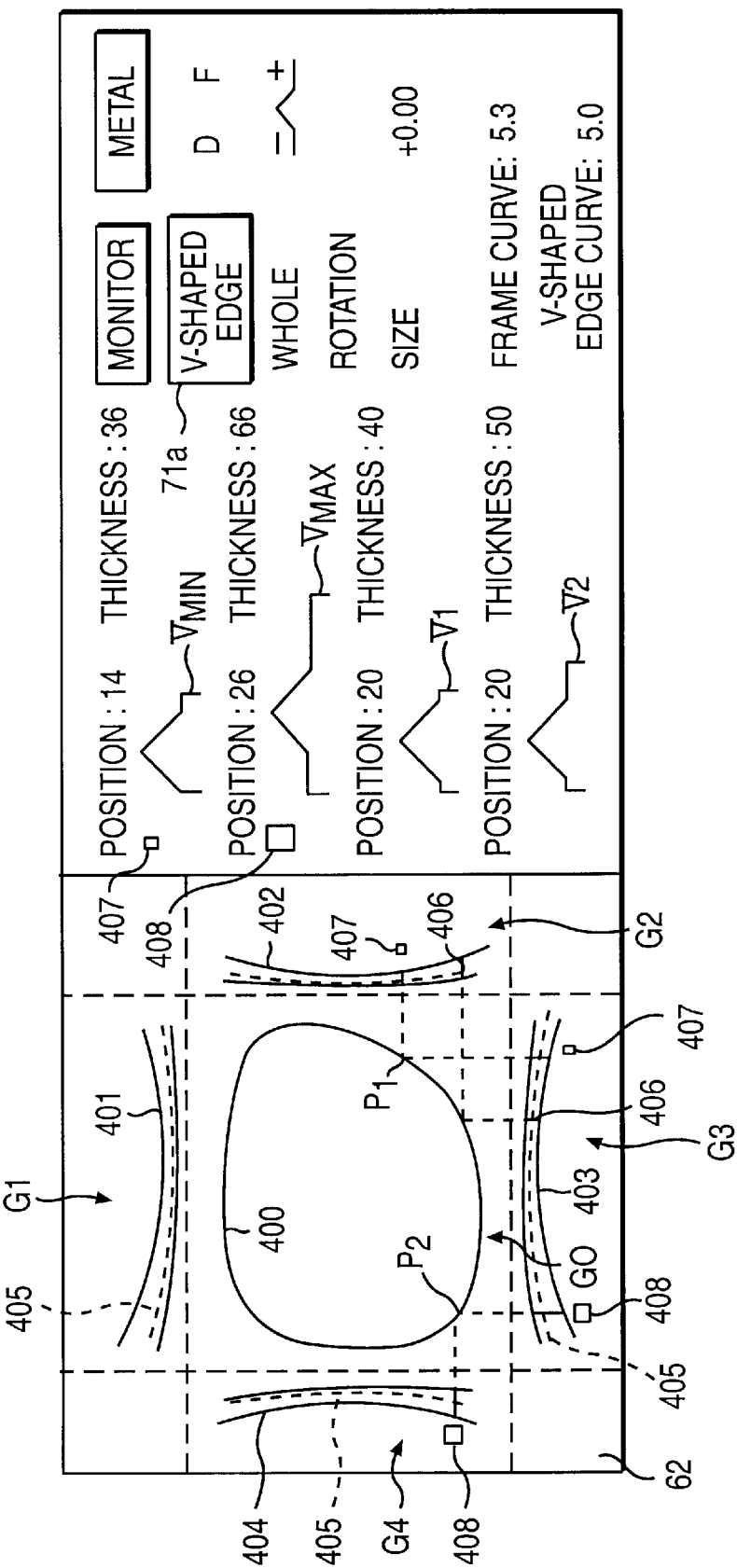
FIG. 12 is a schematic view of a display of a liquid crystal panel of the lens edging machine shown in FIG. 2.

Next, when the switch 64 is turned on to select the "monitor" mode in the grind course, the control circuit 94 actuates an image formation circuit 93 to display a simulation image of a lens edge, such as that shown in FIG. 12, on the liquid crystal display panel 62. On a first display portion G0 on the left side of the display panel 62, the contour of a lens frame (i.e., the contour of an eyeglass lens) 400 is displayed based on the radius vector information (θi, ρi).

In addition, on second display portions G1 through G4 around the displayed contour, a first side contour data image 401, a second side contour data image 402, a third side contour data image 403, and a fourth side contour data image 404 are displayed respectively in a clockwise direction from the top. In the figure, reference numeral 405 designates a position (i.e., ridge) of a V-shaped edge of the lens, reference numeral 406 designates a cursor which is moved by the operation of the cursor key 71, reference numeral 407 designates a small black square pointer for pointing the thinnest part of the lens edge which is point P1 on the edge of the eyeglass lens 400, and reference numeral 408 designates a large black square pointer for pointing the thickest part of the lens edge which is point P2 on the edge of the eyeglass lens 400.

In the middle of the display panel 62, there are displayed a cross-sectional V-shaped edge Vmin at the point P1 of the thinnest part, a cross-sectional V-shaped edge Vmax at the point P2 of the thickest part, a cross-sectional V-shaped edge V1 at an optional point, and a cross-sectional V-shaped edge V2 at an optional point together with their positions and thicknesses, downward from the top.

Any one of digital-free V-shaped edge "DF", after-back-surface V-shaped edge "EX", after-front-surface V-shaped edge "Front", and straight-line V-shaped edge "O" can be selected by, as described above, turning on the switch 64 to select the "monitor" mode in the grind course, thereafter displaying a V-shaped edge simulation image, such as that shown in FIG. 12, on the liquid crystal display panel 62, thereafter causing the cursor symbol 71a to coincide with the position of a displayed "V-shaped edge" by the operation of the cursor key 71, and operating the "+" switch (key) 69 and the "−" switch (key) 70. This selection is confirmed by discerning the ridge 405 of the V-shaped edge which is shown by a broken line. In the digital-free V-shaped edge "DF", the computer, i.e., the arithmetic/judgment circuit 91 sets an ideal V-shaped edge position; in the after-back-surface V-shaped edge "EX", an ideal V-shaped edge position is set for an EX lens/character lens; in the after-front-surface V-shaped edge "Front", an ideal V-shaped edge position is set to fit a front lens-surface on the front surface of an optical/cell frame; and in the straight-line V-shaped edge "O", a rectilinear V-shaped edge is set so that a lens is fit in the lens frame of a flat eyeglass-frame.

Figure 13A:
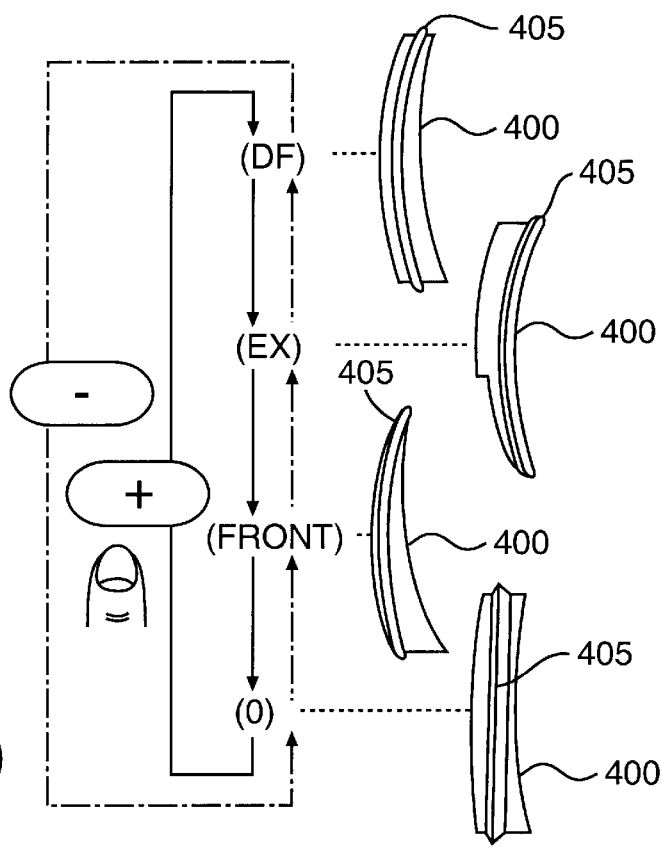
FIGS. 13(a) and 13(b) are views for explaining the setting of the position of the ridge of a V-shaped edge of an eyeglass lens shown in FIG. 12.
Figure 13B:
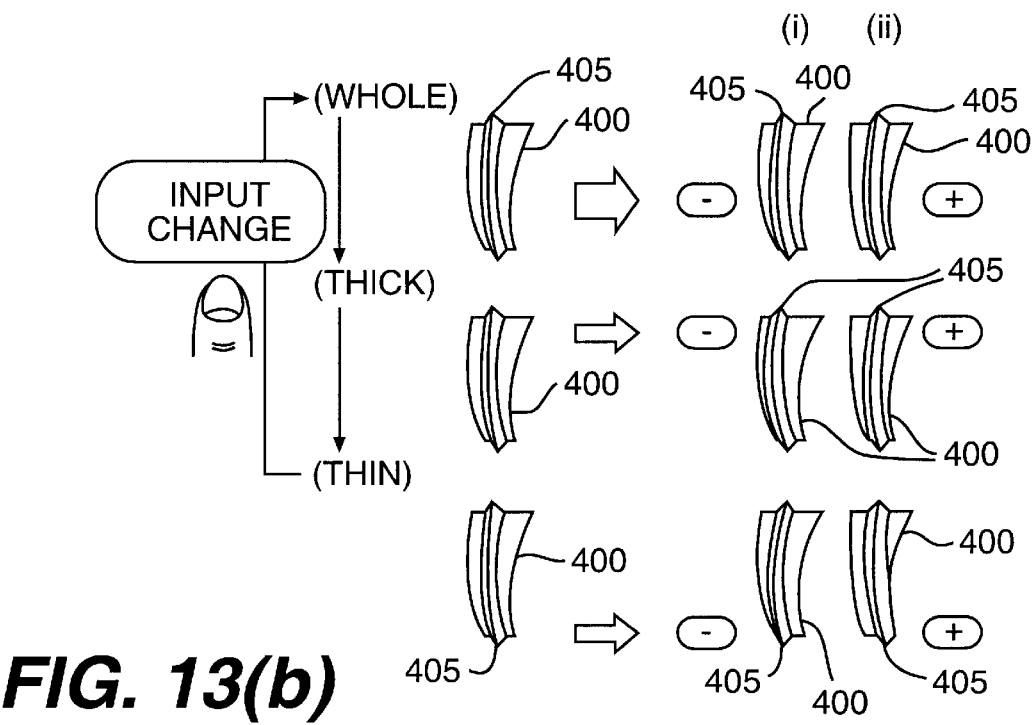

In addition, any one of the modes "whole", "thick", and "thin" shown in FIG. 13(b) can be selected by positioning the cursor 71a on "whole" displayed on the display panel 62 and then operating the switch 68. In the mode "whole", the ridge of a V-shaped edge on the whole circumference can be moved back and forth; in the mode "thick", the ridge of a V-shaped edge at the point P2 of the thickest part can be moved back and forth; and in the mode "thin", the ridge of a V-shaped edge at the point P1 of the thinnest part can be moved back and forth. The "+" switch 69 is operated to move the ridge backward ("ii" in the figure), and the switch 70 is operated to move the ridge forward ("i" in the figure).

In addition, a cursor line 406 can be moved on the side contour data images 401 through 404 clockwise by positioning the cursor 71a on "rotation" displayed on the display panel 62 and then operating the "+" switch 69, whereas the cursor line 406 can be moved on the side contour data images 401 through 404 counterclockwise by positioning the cursor 71a on "rotation" and then operating the "−" switch 70. Accordingly, the cross-sectional V-shaped edges V1, V2 can be obtained by operating the setting switch 86.

"Metal" on the right of "monitor" displayed on the display panel 62 designates that the eyeglass frame is metallic. This can be changed by operating the "frame" mode switch 65. The geometrical center is indicated by "■", whereas the optical center is indicated by "+", which is obtained from various data for grinding an eyeglass lens, such as PD (data on the distance between the pupils of a person wearing the eyeglass), FPD (data on the distance between the geometrical centers of lenses to be fit in the eyeglass frame), and UP (data on the upsetting or downsetting of the pupil position). The pointers are not limited to the above-shown ones. Instead of "■" of the geometrical center and "+" of the optical center, use may be made of "○" for indicating the geometrical center and "■" for indicating the optical center. In addition, the present invention is not limited to the above-mentioned embodiment. For example, pointers, such as "■" and "○", for indicating an optional position of the edge of a lens to be fit in an eyeglass frame may be superimposed on each other at a position of the lens edge, and a cursor may be positioned on a side contour data image shown from two directions. Boundary images of the first to fourth side contour data images are omitted in the above embodiment, but the outer shapes of the V-shaped edges corresponding to them may be displayed.

Second Embodiment

Figure 15A:
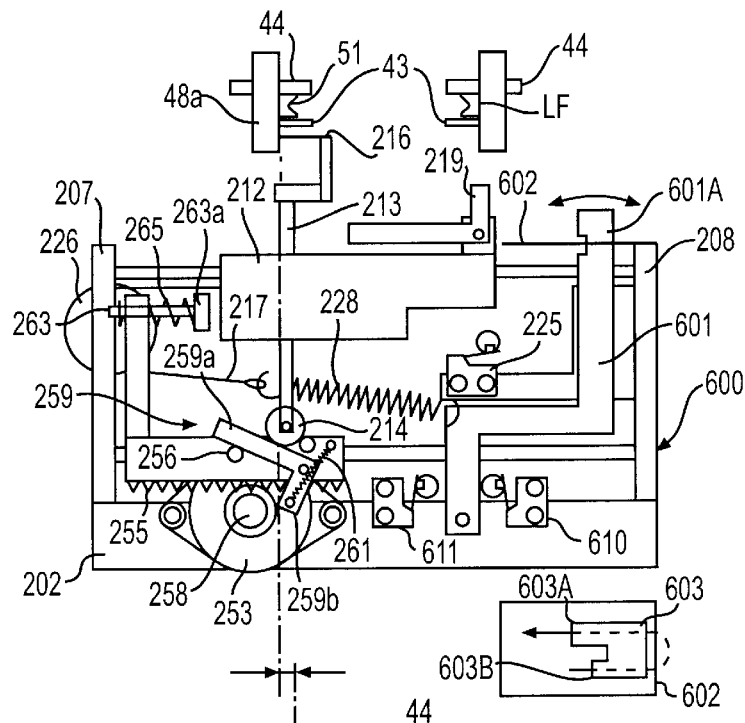
FIG. 15(a) is a schematic view showing a construction of a second embodiment.
Figure 15B:
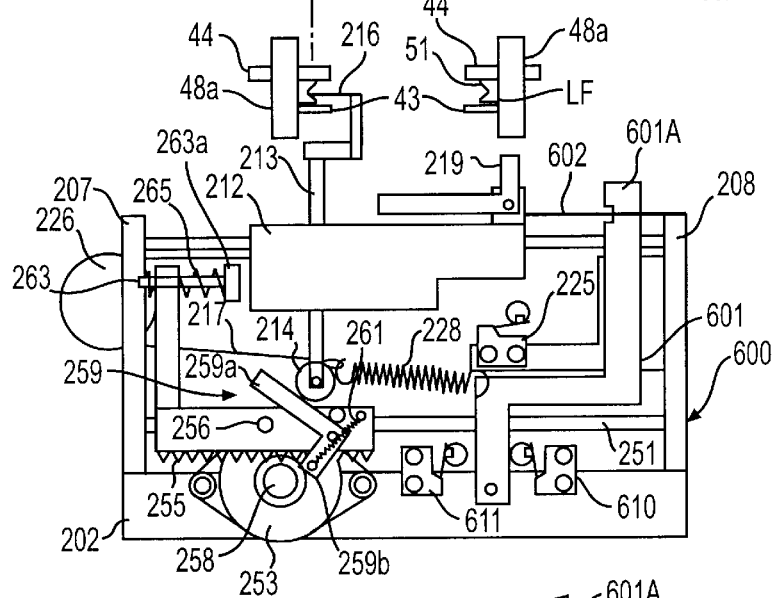
FIG. 15(b) is a schematic view showing a state in which the pressure is set at normal.
Figure 15C:
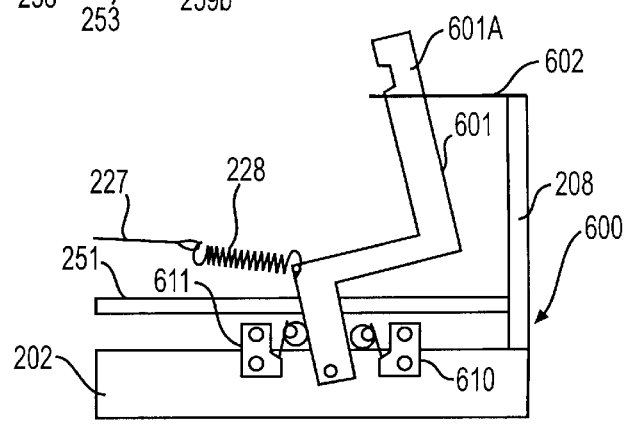
FIG. 15(c) is a schematic view showing a state in which the pressure is set at weak.

FIGS. 15(a) to 15(c) show a construction of a pressure switching means 600. In the second embodiment, the pressure of the spring 228 is switched by the manual operation of a switching lever 601. The lower part of the switching lever 601 is pivotably attached to the side face of the rotation base 202, and the switching lever 601 is turnable in a direction of an arrow. An end of the spring 228 is attached to the switching lever 601, and thereby the switching lever 601 is urged to be turned counterclockwise. An operating portion 601A which is the upper part of the switching lever 601 is inserted into a hole 603 formed in an operating plate 602 and juts out of the hole 603 upward. The hole 603 of the operating plate 602 has a concave portion 603A for setting the pressure to be weak and a concave portion 603B for setting the pressure to be normal. The concave portions 603A and 603B are formed parallel to each other. When the operating portion 601A of the switching lever 601 is positioned at the concave portion 603B, the spring 228 is spread, as shown in FIG. 15(b), and thereby the pressure of the measuring element 216 is set to be normal. At this time, the micro switch 610 is turned on, and thereby "normal" showing that the pressure is normal is displayed on the display portion.

On the other hand, when the operating portion 601A of the switching lever 601 is positioned at the concave portion 603A, the spring 228 is shortened, as shown in FIG. 15(c), and thereby the pressure of the measuring element 216 is set to be weak. At this time, the micro switch 611 is turned on, and thereby "weak" showing that the pressure is weak is displayed on the display portion.

In the second embodiment, a measurement result of a rim thickness is displayed on the display portion, and, according to the measurement result, the switching lever 601 is operated, and thereby the pressure is switched. This can prevent a thin rim from being deformed by the pressure.

Figure 17:
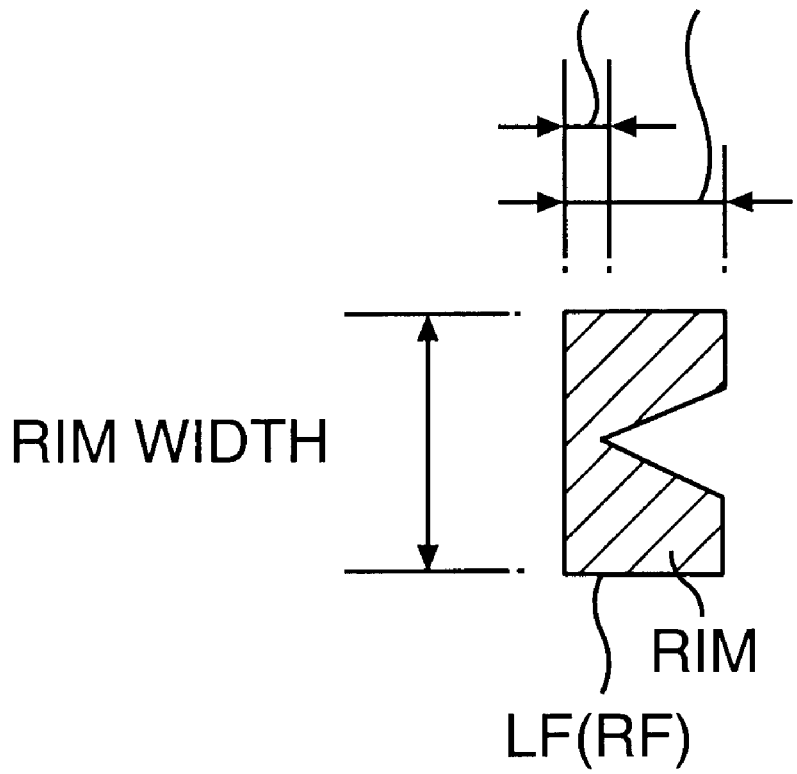
FIG. 17 is an explanation view of a rim.

In a lens frame contour measuring apparatus, such as that disclosed in Japanese Published Unexamined Patent Application Hei 3-135708, only the distance from the front side to the back side of the rim of an eyeglass, i.e., only the width of the rim is measured. In other words, a thickness in radius vector of the rim (i.e., a rim thickness) is not measured (see FIG. 17). In addition, the pressure of the feeler which is in contact with the V-shaped groove of the eyeglass frame is fixed, In these days, as a result of designing the fashions of an eyeglass frame, an eyeglass frame with an extremely thin rim is very much in fashion. If this type of eyeglass frame with an extremely thin rim is measured by the measuring apparatus disclosed in the aforementioned Patent Application (Hei 3-135708), there is a fear that the eyeglass frame will be deformed by the excessive pressure of the feeler because, as mentioned above, the pressure of the feeler is fixed.

However, If the lens frame contour measuring apparatus has a measuring means for measuring a thickness in radius vector of a rim of an eyeglass frame, a specific point on the outer circumference of the lens frame of the eyeglass frame can be made a reference point in order to measure the contour of a V-shaped groove, into which an eyeglass lens is fit, along the inner circumference of the lens frame.

Further, if the lens frame contour measuring apparatus provided with the measuring element by which the contour of the lens frame is measured has a pressure switching means for switching the pressure of the measuring element against the lens frame, the pressure of the measuring element can be switched according to a measured rim thickness. Therefore, the lens frame whose rim is thin can be prevented from being deformed during measurement, and thus accurate measurement can be performed.

Further, if the lens frame contour measuring apparatus provided with the measuring element has both the measuring means for measuring a thickness in radius vector of a rim of an eyeglass frame and the pressure switching means for switching the pressure of the measuring element against the lens frame according to a measured rim thickness, a specific point on the outer circumference of the lens frame can be made a reference point in order to measure the contour of a V-shaped groove along the inner circumference of the lens frame, and, in addition, the lens frame whose rim is thin can be prevented from being deformed during measurement, and thus accurate measurement can be performed.

Further, a lens frame contour measuring apparatus, such as that disclosed in Japanese Published Unexamined Patent Application SHO 61-267732. Japanese Published Unexamined Patent Application HEI 3-261814, or Japanese Published Unexamined Patent Application HEI 4-93163, has a construction in which the rim of an lens frame is clamped by clamp pins in an up and down direction. In this apparatus, when the eyeglass frame is placed in the apparatus, the lens frame of the eyeglass frame must be inserted between the clamp pins without being struck against the clamp pins from above. This is a troublesome operation, and much time is consumed.

However, the eyeglass frame can be smoothly attached to and detached from the measuring apparatus without the fact that the rim of the lens frame catches on the right-hand clam pins and left-hand clamp pins if the measuring apparatus has a pair of sliders each of which has a holding plane being allowed to proceed to and recede from the other holding plane, the pair of clamp pins which jut out of the holding plane and move together with the sliders and clamp the rim of a lens frame in the up and down direction, at least one of the clamp pins being capable of going in and out the holding plane. Thus, there is no fear that the rim will be deformed or damaged.

Another Embodiment

Figure 18A:
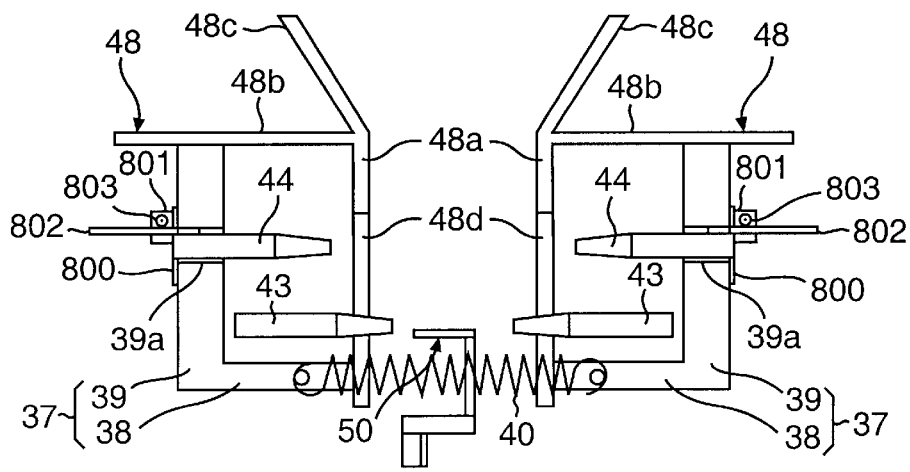
FIGS. 18(a) to 18(c) are schematic views showing another example of an eyeglass frame holding means.
Figure 18B:
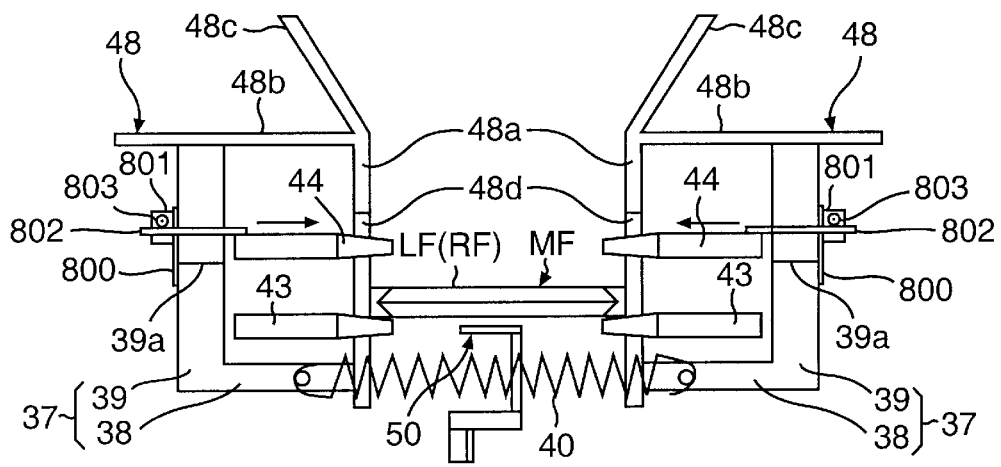
Figure 18C:
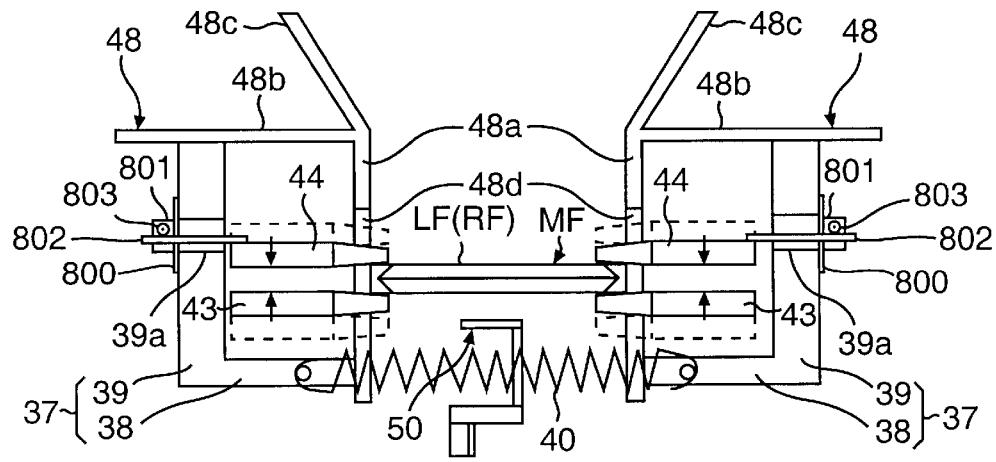

The present invention is not limited to the above embodiments. A construction may be adopted as shown in FIGS. 18(a) to 18(c). In this embodiment shown in the figures, the engagement claw 46 shown in FIGS. 6(a) through 6(c) is omitted, and the holding claw 44 is changed in attachment construction. The others in this embodiment are the same as those shown in FIGS. 6(a) through 6(c).

In FIGS. 18(a) to 18(c), the holding claw 43 is attached to a movable supporter 37 as in FIGS. 6(a) to 6(c). A through hole 39a is formed in a vertical portion 39 of the movable supporter 37, and a guide rail 800 extending upward and downward is attached to the rear face of the vertical portion 39. A slider 801 is attached to the guide rail 800 movably up and down. A rack bar 802 passing through the through hole 39a is laterally movably attached to the slider 801. A drive pinion 803 attached to the slider 801 is engaged with the rack bar 802. The holding claw 44 is fixed to the end of the rack bar 802 on the side of an opening 48d.

Figure 19:
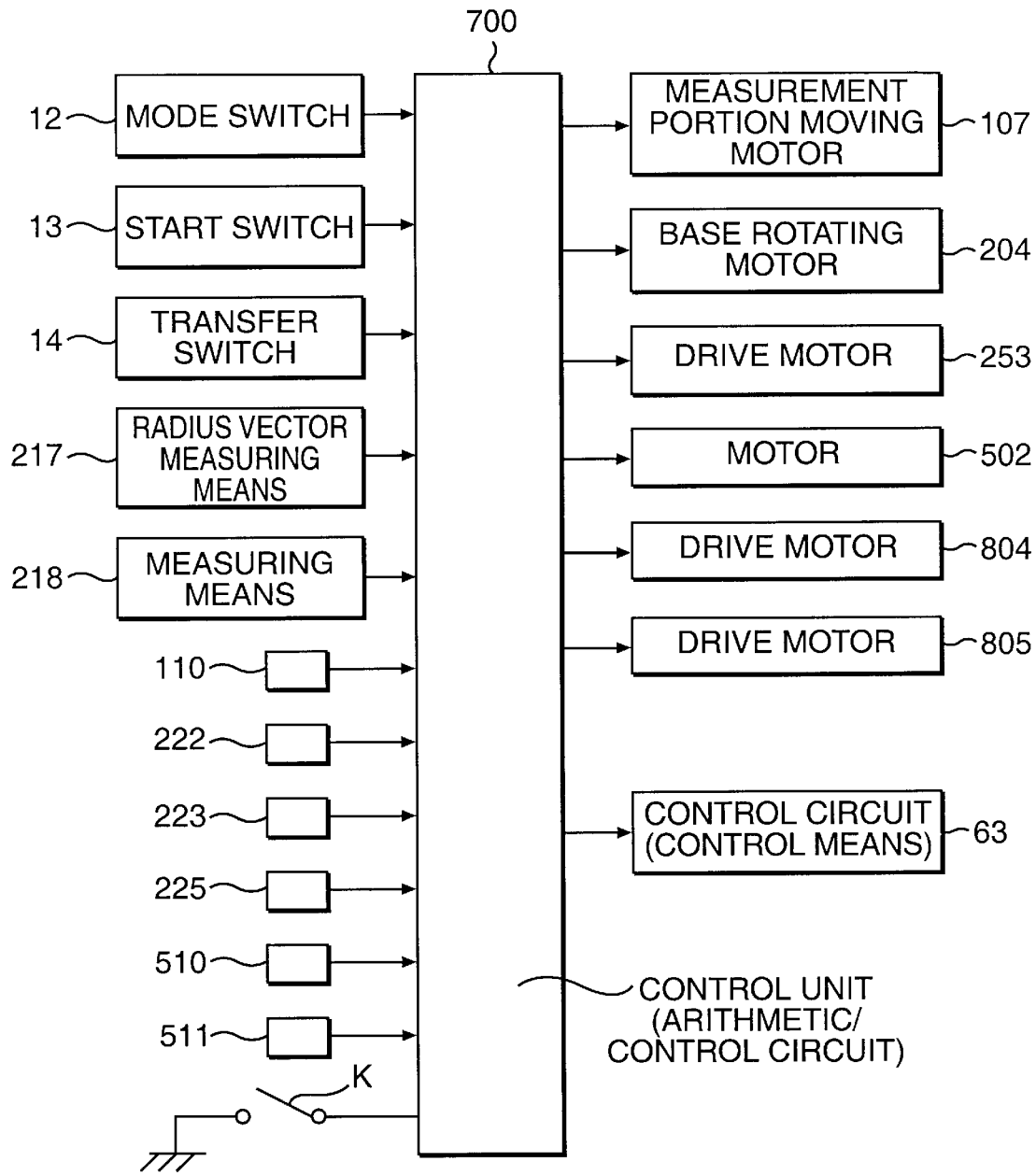
FIG. 19 is a block diagram of the eyeglass frame holding means shown in FIGS. 18(a) to 18(c) which includes a driving system.

The slider 801 is moved up and down by a drive motor 804 shown in FIG. 19, and the drive pinion 803 is rotated by a drive motor 805. The slider 801 and the drive pinion 803 are moved and rotated at the following timing.

In a state in which the operation lever 27 shown in FIG. 4 is in "open" position, the base of the holding claw 44 is within the through hole 39a, as shown in FIG. 5(a), and the front end of the holding claw 44 is situated in a refuge position between the vertical portions 39 and does not jut out of a vertical portion 48a.

In this state, the eyeglass frame MF is placed between the inclined guide plates 48c and thereafter is pressed down from above, resisting the spring force of the coil spring 40.

As a result, by the guide action of the guide plates 48c, the distance between the frame guide members 48, 48, i.e., the distance between the movable supporters (sliders) 37, 37 is enlarged, and the lens frame LF, RF (i.e., rim) of the eyeglass frame MF is moved to the holding claws 43, 43 and is stopped and held by the holding claws 43, 43.

Thereafter, when the operation lever 27 shown in FIG. 4 is operated from "open" position to "close" position, a switch (not shown) is turned on at the beginning of the turn of the operation lever 27, the drive pinion 803 is then rotated by the drive motor, the rack bar 802 and the holding claw 44 are then moved to the opening 48d of the vertical portion 48a as shown by an arrow, the end of the holding claw 44 is then caused to project from the opening 48d as shown in FIG. 18(*b*), and the base of the holding claw 44 comes out from the through hole 39a. Thereafter, the slider 801 is moved down by a drive motor (not shown), and the holding claw 44 is moved down from the position shown by the broken line to the position shown by the solid line in FIG. 18(*c*).

When the operation lever 27 is turned to the "close" position, as mentioned above, the movement of the operation lever 27 is transmitted to the drum shaft 33 through the rotation shaft 25, the gears 26, 24, and the operation shaft 23. Accordingly, a part of the spring 35 is wound round the drum shaft 33, and thereby the claw mounting plate 42 is turned upward centering the plate side 42a by means of the wire 36 joined to the spring 35, and the holding claw 43 is moved up from the position shown by the broken line to the position shown by the solid line as in FIG. 18(*c*). As a result, the distance between the holding claws 43 and 44 is decreased, and the lens frame LF (RF) of the eyeglass frame MF is held between the holding claws 43 and 44. In this position, the movable pin 31 is fixed at the lower portion 20a of the circular slit 20 by means of the force of the spring 32.

In order to remove the lens frame LF (RF) of the eyeglass frame MF from between the holding claws 43 and 44, the operation lever 27 is operated in the opposite manner to the aforementioned operation. Thereby, a second switch (not shown) is turned on and actuated, and the members are operated conversely.

In this embodiment, the holding claw 44 is moved laterally (i.e., goes in and out the opening 48d) and is moved up and down by means of the drive motor. Instead of the drive motor, a solenoid may be used. Alternatively, the same operation as shown in FIGS. 18(*a*) to 18(*c*) may be performed by the use of a wire or a gear driving mechanism which is interrelated with the operation lever 27. In the aforementioned embodiment, for convenience, a description was given of the construction in which the movable supporters 37, 37 are pressed to approach each other directly by means of the coil spring 40, because this is not important for the preset invention. However, in fact, a mechanism having wires and pulleys or a mechanism having gears is used by which the movable supporters 37, 37 are allowed to proceed to or recede from each other in such a way that one of the supporters 37, 37 is moved with respect to the middle therebetween correspondingly when the other supporter 37 is moved with respect to the middle.

As described above, the measuring apparatus according to the present invention is provided with the feeler erecting means for erecting the measuring element by sensing the template holding means so as to measure the lens-shaped template held by the template holding means, and therefore the measuring element can be automatically situated at a measurement reference position.

What is claimed is:

1. An apparatus for measuring a contour of a lens-shaped template formed to be fit into a lens frame of an eyeglass frame, said apparatus comprising:

lens-shaped template holding means for holding the lens-shaped template;

a measurement element for measuring a contour of the lens-shaped template held by said lens-shaped template holding means;

starting means for starting said measurement element measuring the contour of the lens-shaped template; and positioning means for positioning said measurement element at a measurement reference point when said starting means starts the measurement by said measurement element.

2. An apparatus for measuring a contour of a lens-shaped template formed to be fit into a lens frame of an eyeglass frame, said apparatus comprising:

lens frame holding means for holding the lens frame of the eyeglass frame;

lens-shaped template holding means for holding a lens-shaped template;

measurement elements for measuring a contour of the lens frame held by said lens frame holding means and measuring a contour of the lens-shaped template held by said lens-shaped template holding means, respectively;

sensing means for sensing that said lens-shaped template holding means has been attached to an apparatus body; and positioning means for positioning each of said measurement elements at a measurement reference point, based on a result of said sensing means.

3. The apparatus of claim 2, further comprising:

a slider disposed to horizontally proceed and recede and horizontally rotate;

said lens frame holding means being disposed above said slider;

said lens-shaped template holding means being disposed above said slider;

the measurement element for the lens frame being attached to said slider so as to be vertically movable and being engaged with a V-shaped groove of the lens frame of the eyeglass frame;

radius vector measurement means for measuring a radius vector of the lens frame or the lens-shaped template, based on an amount of horizontal movement of said slider;

the measurement element for the lens-shaped template being attached to said slider so as to be freely erected and laid down, and measuring the contour of the lens-shaped template held by said lens-shaped template holding means during being erected;

feeler erecting means for erecting and positioning said lens-shaped template measurement element at the measurement reference point, based on a result of said sensing means, so that the contour of the lens-shaped template held by said lens-shaped template holding means can be measured; and arithmetic and control means for calculating a radius vector $\rho i$ from said radius vector measurement means with respect to an angle $\theta i$ of rotation of said slider.

4. The apparatus of claim 3, further comprising:

a slide base attached to a fixed base so as to be horizontally moved;

a motor for driving and moving said slide base;

a rotatable base mounted on said slide base so as to be horizontally rotated; and a base rotating motor for driving and rotating said rotatable base;

wherein said slider is attached to said rotatable base so as to be horizontally moved, so that said slider can horizontally proceed or recede and horizontally rotate.

5. The apparatus of claim 4, further comprising:

urging means for urging said slider in one direction in which said slider proceeds or recedes; and slider driving means for driving and moving said slider in a direction opposite to the direction urged by said urging means.

6. The apparatus of claim 4 or claim 5, wherein:

said eyeglass frame holding means has a pair of movable supporters capable of holding said eyeglass frame, said movable supporters being attached to said slide base so that said movable supporters can proceed to or recede from each other; and said lens-shaped template holding means is situated above said slider and between said movable supporters, said lens-shaped template holding means being attachable to and detachable from the apparatus body including said fixed base.

7. The apparatus of claim 6, wherein said lens-shaped template measurement element is provided to be held by measurement element holding means at two positions of a laid-down position and an erected position.

8. The apparatus of claim 7, said feeler erecting means having:

an engagement portion extending downward from said lens-shaped template holding means; and an erection drive piece formed integrally with a base of said lens-shaped template measurement element such that said erection drive piece can be erected when said lens-shaped template measurement element is laid down and can be engaged with said engagement portion when said slider is horizontally moved, whereas said erection drive piece can be laid down when said lens-shaped template measurement element is erected and cannot be engaged with said engagement portion when said slider is horizontally moved.

* * * * *